United States Patent [19]
Oguro et al.

[11] Patent Number: 6,032,265
[45] Date of Patent: Feb. 29, 2000

[54] FAULT-TOLERANT COMPUTER SYSTEM

[75] Inventors: Hiroshi Oguro, Hadano; Shinichiro Yamaguchi, Mito; Yoshihiro Miyazaki; Soichi Takaya, both of Hitachi; Masataka Hiramatsu; Nobuo Akeura, both of Ebina, all of Japan

[73] Assignee: Hitachi, Ltd., Tokyo, Japan

[21] Appl. No.: 08/682,956

[22] Filed: Jul. 18, 1996

[30] Foreign Application Priority Data

Jul. 18, 1995 [JP] Japan ............................ 7-181222

[51] Int. Cl.⁷ .................................................. G06F 11/00
[52] U.S. Cl. ............................................................ 714/9
[58] Field of Search ....................... 395/182.07, 182.1, 395/182.08; 370/220, 226; 714/9

[56] References Cited

U.S. PATENT DOCUMENTS

| | | | |
|---|---|---|---|
| 4,907,228 | 3/1990 | Bruckert et al. | 395/182.09 |
| 4,920,540 | 4/1990 | Baty | 714/3 |
| 4,926,315 | 5/1990 | Long et al. | 395/183.19 |
| 5,146,589 | 9/1992 | Peet, Jr. et al. | 714/3 |
| 5,255,367 | 10/1993 | Bruckert et al. | 395/182.09 |
| 5,276,823 | 1/1994 | Cutts, Jr. et al. | 714/11 |
| 5,295,258 | 3/1994 | Jewett et al. | 395/182.1 |
| 5,317,726 | 5/1994 | Horst | 395/182.1 |
| 5,384,906 | 1/1995 | Horst | 395/553 |
| 5,588,111 | 12/1996 | Cutts, Jr. et al. | 395/182.07 |

FOREIGN PATENT DOCUMENTS

| | | |
|---|---|---|
| 57-20847 | 2/1982 | Japan . |
| 4-241039 | 8/1992 | Japan . |
| 4-311238 | 11/1992 | Japan . |
| 6-95903 | 4/1994 | Japan . |

OTHER PUBLICATIONS

Nikkei Electronics, May 9, 1983, pp. 197–202.

*Primary Examiner*—Robert W. Beausoliel, Jr.
*Assistant Examiner*—Pierre E. Elisca
*Attorney, Agent, or Firm*—Beall Law Offices

[57] ABSTRACT

A fault-tolerant computer system, which prevents an I/O fault from reaching the CPU block while using an alternative I/O block to continue processing, employs common general-purpose processors with a minimum of specialized peripheral circuits. Dual system bus adapters are provided not in the fast-operating CPU portion requiring sophisticated packaging technology, but in the low-speed interface between the CPUs and the I/O bus adapters. This allows the CPUs and I/O bus adapters to be shared by ordinary data processors, workstations, or personal computers while implementing a fault-tolerant computer system. If a one-shot hardware fault occurs in a CPU or in an I/O bus adapter, the faulty component is disconnected from the system so that the system will operate uninterruptedly.

9 Claims, 21 Drawing Sheets

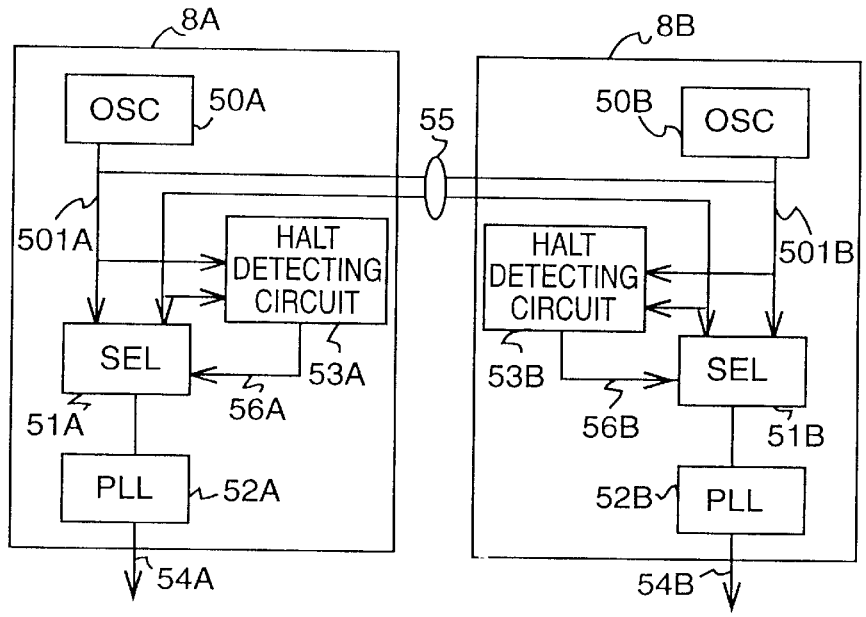

FIG. 7

60 LIST OF INTER-DSBA INTERFACE SIGNALS

| NO. | SIGNAL SYMBOL | SIGNAL NAME | QTY. | |
|---|---|---|---|---|
| 1 | ZAWGRT-N | SEGMENT A SYSTEM BUS USE ENABLE | 1 | ~61A |
| 2 | ZBWGRT-N | SEGMENT B SYSTEM BUS USE ENABLE | 1 | ~61B |
| 3 | ZAWREQ-N | SEGMENT A SYSTEM BUS REQUEST | 1 | ~62A |
| 4 | ZBWREQ-N | SEGMENT B SYSTEM BUS REQUEST | 1 | ~62B |
| 5 | ZAWPTY-N | NO. 1,3 PARITY | 1 | |
| 6 | ZBWPTY-N | NO. 2, 4 PARITY | 1 | |
| 7 | ZAWDSER-N | SEGMENT A DSBA ERROR DETECTION SIGNAL | 1 | ~63A |
| 8 | ZBWDSER-N | SEGMENT B DSBA ERROR DETECTION SIGNAL | 1 | ~63B |

FIG. 9

| 125 | 123 | 122 | 124 | |
|---|---|---|---|---|
| DISCONNECTION REQUEST TO CURRENT SEGMENT | DISCONNECTION REQUEST TO OTHER SEGMENT | STATUS OF CURRENT CPU | DECISION OUTPUT | REMARKS |
| PRESENT | PRESENT | -- | DO NOTHING | 2 DUAL FAULT |
| PRESENT | ABSENT | -- | DO NOTHING | CURRENT SEGMENT DISCONNECTED |
| ABSENT | PRESENT | ON-LINE | DISCONNECT OTHER SEGMENT | |
| ABSENT | PRESENT | FAULTY | DO NOTHING | |
| ABSENT | ABSENT | -- | DO NOTHING | NORMAL |

| STATE | DEFINITION | MAJOR OPERATION |
|---|---|---|
| NONE | YET TO BE INSTALLED OR CLOCK STOPPED | |
| INIT | CPU BEING INITIALIZED | THE CPU OF THE CURRENT SEGMENT IS BEING INITIALIZED IN ASYNCHRNISM WITH THE OTHER SEGMENT |
| READY | MEMORY COPY COMMAND AWAITED | |
| COPY | MEMORY COPY BEING EXECUTED | THE MEMORY CONTENTS ARE BEING MATCHED DURING MEMORY COPY OPERATION FROM THE OTHER SEGMENT |
| ONLN | INCORPORATED IN THE SYSTEM | IF BOTH CPU'S ARE ON-LINE, THEY ARE MADE TO PERFORM ON-LINE TASKS IN SYNCHRONISM. IF THE CPU OF THE OTHER SEGMENT IS PERFORMING A COPY OPERATION, ON-LINE TASKS ARE PERFORMED WHILE THE MEMORY COPY OPERATION IS IN PROGRESS. |
| DISCON | DISCONNECTED FROM DSC BY THE OTHER SEGMENT | I/O BUS ACCESS BY THE CPU OF THE CURRENT SEGMENT IS SUPPRESSED BY THE DSBA |

FIG. 18

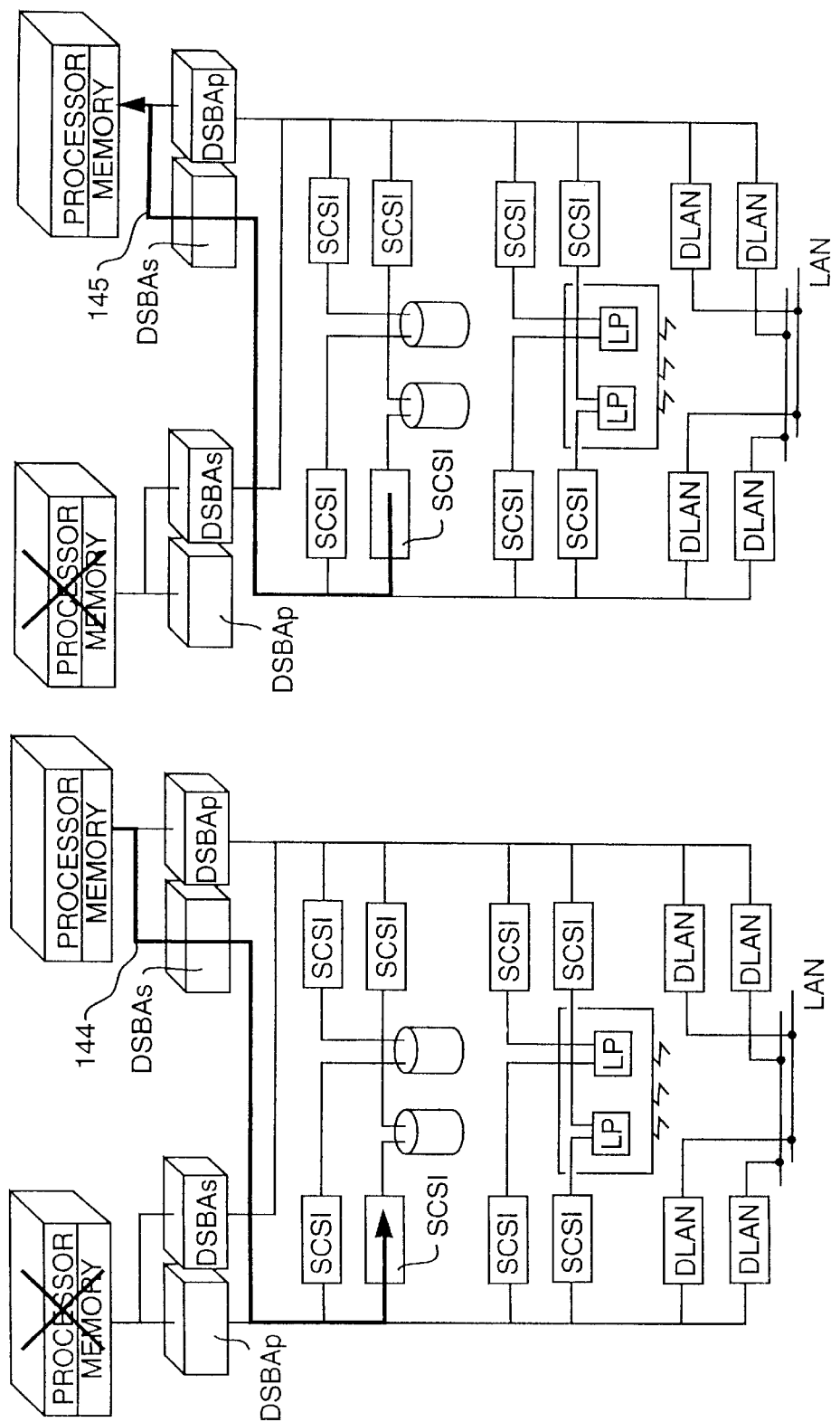

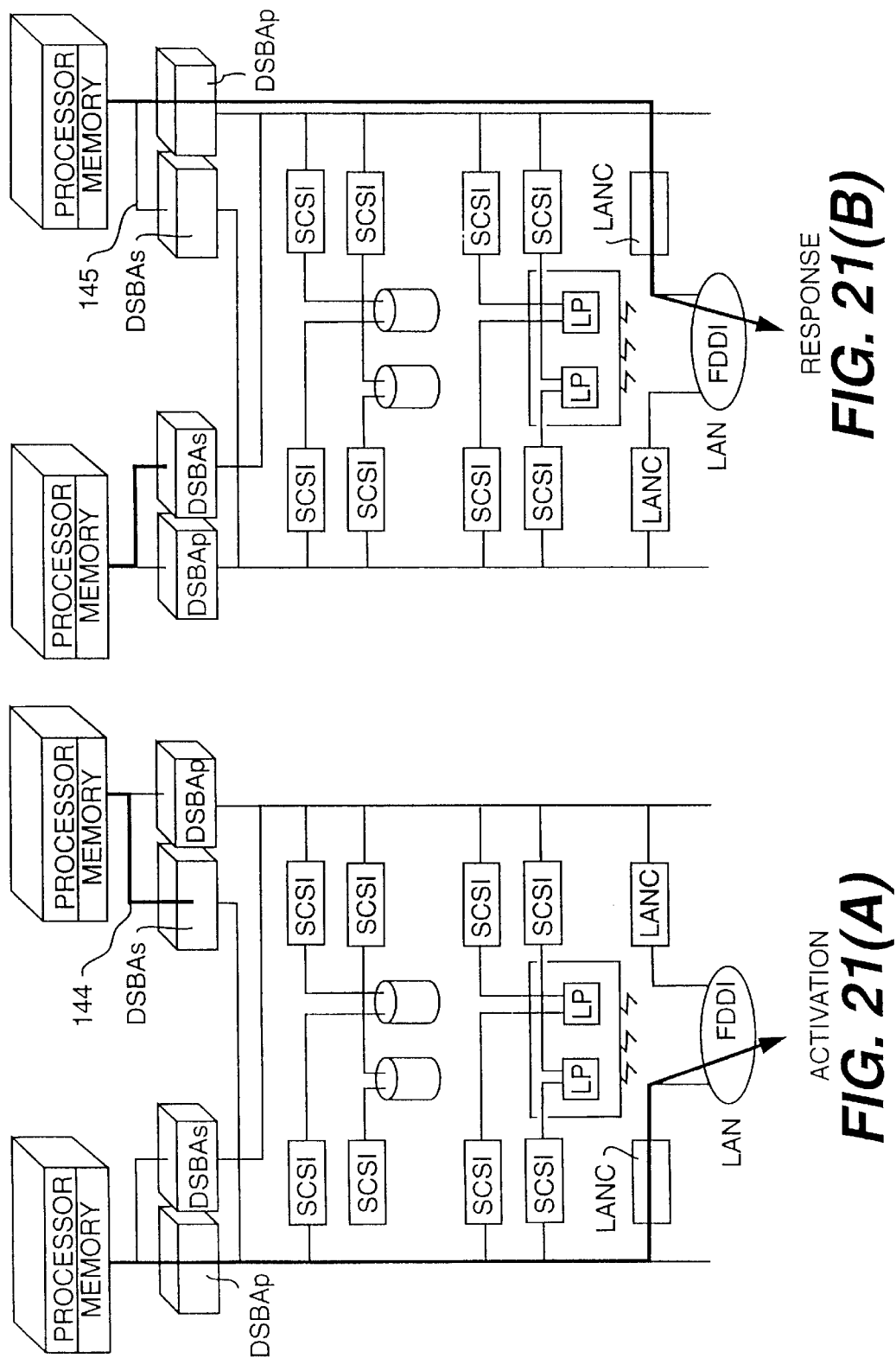

FAULT-TOLERANT COMPUTER SYSTEM

BACKGROUND OF THE INVENTION

1. Field of the Invention

The present invention relates to a fault-tolerant computer system with emphasis on the connection between central processing units (CPUs) and input/output adapters. More particularly, the invention relates to connection controls on the side of input/output adapters in a dual-structure fault-tolerant computer system, wherein not only the input/output adapters but also processors and memories are furnished on a duplex basis.

2. Description of the Related Art

Recent years have seen computer technology gaining widespread use. In particular, traffic control systems, banking systems, and other critical structures are being supported by computers. Deployed in such a ubiquitous manner, the computers can cause enormous problems in the functioning of society, if any were to fail. Because of the potential for far-reaching adverse effects in the event of failure, computers are being required to ensure ever-higher reliability.

Sustained demands for enhanced computer reliability exist notably in the field of electronic control. Such demands have been met in part by multiple-computer systems such as the one disclosed in Japanese Patent Laid-Open No. Sho 57-20847. The disclosed system operates under a scheme of having a plurality of computers perform the same calculations, whose results are compared at the point of data output so that only the correct results are output, which presupposes that output timings are synchronized by software for comparison. The proposed scheme is suitable for use in control systems of relatively small scale; the scheme cannot be applied to today's complicated, large-scale application programs because huge efforts are needed to compare data when the programs are run.

Recently, however, a number of proposals regarding fault-tolerance technology have been made for data comparison based primarily on hardware. One scheme of fault-tolerance technology is disclosed illustratively in U.S. Pat. Nos. 5,317,726 and 5,384,906. As its precondition, the scheme involves getting typically three identical CPUs to perform the same command stream and decide, by majority, the results of the command execution. In connection with this scheme, when the processors taking part in the majority-based decision operate on independent clocks, appropriate measures are needed to synchronize these processors in operation. Traditionally, multi-processor computers have been used extensively to meet the demand for higher processing performance. A typical fault-tolerance technique used by the multi-processor computer is the so-called pair-and-spare method. The method, described illustratively in *Nikkei Electronics*, May 9, 1983, pp. 197–202, involves the use of a pair of wired boards loaded with memories having self-diagnostic functions, and with processors operating in cooperation. With this method, a fault that may occur in one of the two wired boards is bypassed by the circuits on the other board, which keeps functioning. Because the operation continues even in the event of a fault, there is no need to execute a check point restart, in which the processing is restarted from a suitable check point preceding the point in time at which the fault occurred.

Another example of fault-tolerance technology is a dual rail processor disclosed in U.S. Pat. Nos. 4,907,228 and 5,255,367. The disclosed dual rail processor constitutes a fault-tolerant computer system comprising two processors having data paths extending therefrom (i.e., as a dual rail). Shared resources such as a memory are connected to the paths. At the entry to the shared resources are a pair of basic data processors capable of detecting an error by comparing signals from two data buses. An input/output adapter shared by the two data processors has error detecting means for detecting errors at the entry.

A further example of fault-tolerance technology is a computer system disclosed in Japanese Patent Laid-Open No. Hei 4-241039. The disclosed computer system involves the use of a number of wired boards (i.e., replacement units) comprising processor units (BPUs) each equipped with a fault-tolerance function. If a fault occurs in a BPU during operation, its fault-tolerance function maintains normal operation until the next "appropriate" point (called a check point hereunder for convenience) at which the faulty BPU is taken over by another BPU. Check points are established illustratively at points of task changeover. The components making up each BPU are furnished in a multiple (i.e., redundant) structure so that a component becoming defective in the BPU is compensated by a combination of the normal components enabling normal operation to continue up to the next check point. Cache memories whose faults may be detected by parity check are provided in a dual structure. If one of the memories fails, the other normal memory takes over. If general-purpose MPUs are incorporated, they cannot be equipped with self-checking functions. In such cases, the MPUs are furnished in a triple or quadruple structure so that the output signals from these units are compared to select normal units.

As described, if a BPU on a replacement-unit wired board develops an internal fault, the normal processing is still allowed to continue until the next check point is reached. This means the absence of any deterioration in performance attributable to the conventional practice of preserving the check point status upon fault in preparation for a later check point restart. In addition, the absence of paired BPUs eliminates the need for signal lines that are conventionally necessary for clock synchronization between different BPUs. With no clock synchronization required, the clock rate is boosted. Since the MPUs constituting replacement units operate using the same clock signal, no specific operations are required to synchronize the MPUs in operation, which is another contributing factor to the continuation of processing performance.

The conventional techniques outlined above are designed to constitute processors and memories, the minimum environment for executing software, in a multiple structure such that, if any one of these key components fails in operation, it is disconnected on a hardware basis to ensure an uninterrupted program run. That is, any fault that may occur in the processors or memories remains completely transparent to programs. In that respect, these techniques are important to alleviating the burden of special programming for building a fault-tolerant system.

In an effort to make the input/output arrangement highly reliable, the above pair-and-spare method proposes operating a pair of wired boards comprising self-diagnostic input/output adapters. If a circuit fault occurs in one of the two wired boards, the other board takes over and continues normal processing. With the operation kept uninterrupted despite a fault, there is no need to perform the conventional check point restart of input/output processing, whereby the processing would be restarted at a check point preceding the point in time at which the fault occurred. However, this method requires preparing specialized input/output adapters.

The scheme disclosed in U.S. Pat. Nos. 4,907,228 and 5,255,367 proposes an input/output adapter which, shared by a pair of data processors, has error detecting means for error detection at the entry. When a fault is detected, the characteristic of the fault is verified. If the verification reveals that the operation cannot continue, the input/output adapter is disconnected from the system; if the operation is allowed to continue upon verification, a fault processing routine is executed to restore the input/output adapter from the fault. This scheme also requires the use of a specially designed input/output adapter. One disadvantage of the scheme is that if the input/output adapter is found to be inoperable upon fault, that device is disconnected from the system and the processing can no longer continue from that point on.

The above-described conventional schemes and methods utilize general-purpose processors, but require specifically designed peripheral circuits to constitute a multiple CPU arrangement. Compared with ordinary data processors, workstations, and personal computers having the same general-purpose processors, the conventional fault-tolerance techniques are noted for their inevitable high costs and increased overheads of both hardware and software.

Today's general-purpose processors are rapidly rising in performance. The cycle in which to develop ordinary data processors, workstations, and personal computers based on such high-speed processors is getting shorter than ever before. This trend poses a problem in the growing gap in cost-performance between ordinary data processors, workstations, and personal computers on the one hand, and fault-tolerant computers using the same processors but requiring special peripheral circuits on the other.

More specifically, the conventional pair-and-spare method and the scheme disclosed in U.S. Pat. Nos. 4,907,228 and 5,255,367 require specially designed hardware to build fault-tolerant input/output adapters. On the other hand, simply combining ordinary input/output adapters with ordinary data processors, workstations, or personal computers does not constitute fault-tolerance in processors or input/output adapters. In particular, the following problems have been encountered:

(1) Some ultra-high-speed processors used by ordinary data processors, workstations, and personal computers perform I/O access operations asynchronously with respect to I/O access instruction execution. That is, when an I/O access fault is detected and reported, the program can be executing an instruction far ahead of the I/O access instruction that developed the fault.

(2) The input/output adapter used by ordinary data processors, workstations, and personal computers is generally not provided in a dual structure. Nevertheless, two input/output adapters need to be connected illustratively to the data processor as well as to any input/output modules. If a fault occurs in one input/output adapter, that adapter is disconnected as instructed by the data processor, and the other input/output adapter takes over. This setup, however, must always be accompanied by special means which disconnects the faulty input/output adapter from the input/output modules connected thereto, if a fault occurs in an input/output adapter or on the input/output bus.

SUMMARY OF THE INVENTION

It is therefore an object of the present invention to provide a fault-tolerant computer system which employs common general-purpose processors with a minimum of specialized peripheral circuits, which is highly compatible with general-purpose computers, which can be developed in cooperation with a general-purpose computer, and which offers high cost performance.

To achieve this and other objects, the invention provides DSBAs (dual system bus adapters) not in the fast-operating CPU portion requiring sophisticated packaging technology, but in the low-speed interface between the CPUs and the I/O bus adapters. This allows the CPUs and I/O bus adapters to be shared by ordinary data processors, workstations, or personal computers while implementing a fault-tolerant computer system. In such a system, if a one-shot hardware fault occurs in a CPU or in an I/O bus adapter, the faulty component is disconnected unfailingly from the system so that the system will operate uninterruptedly.

BRIEF DESCRIPTION OF THE DRAWINGS

FIG. 7 is a detailed block diagram of the clock circuits (CLK) shown in FIG. 5;

FIG. 9 is a list of typical inter-DSBA interface signals;

FIG. 18 is a list of descriptions defining each of the states of FIG. 17;

FIGS. 20(A) and 20(B) are schematic views outlining an I/O access operation performed when the CPU in one of the two segments has failed;

FIGS. 21(A) and 21(B) are schematic views showing how the LANC switchover upon LANC fault allows the FDDI processing to continue;

DETAILED DESCRIPTION OF THE PREFERRED EMBODIMENTS

Figure 1:
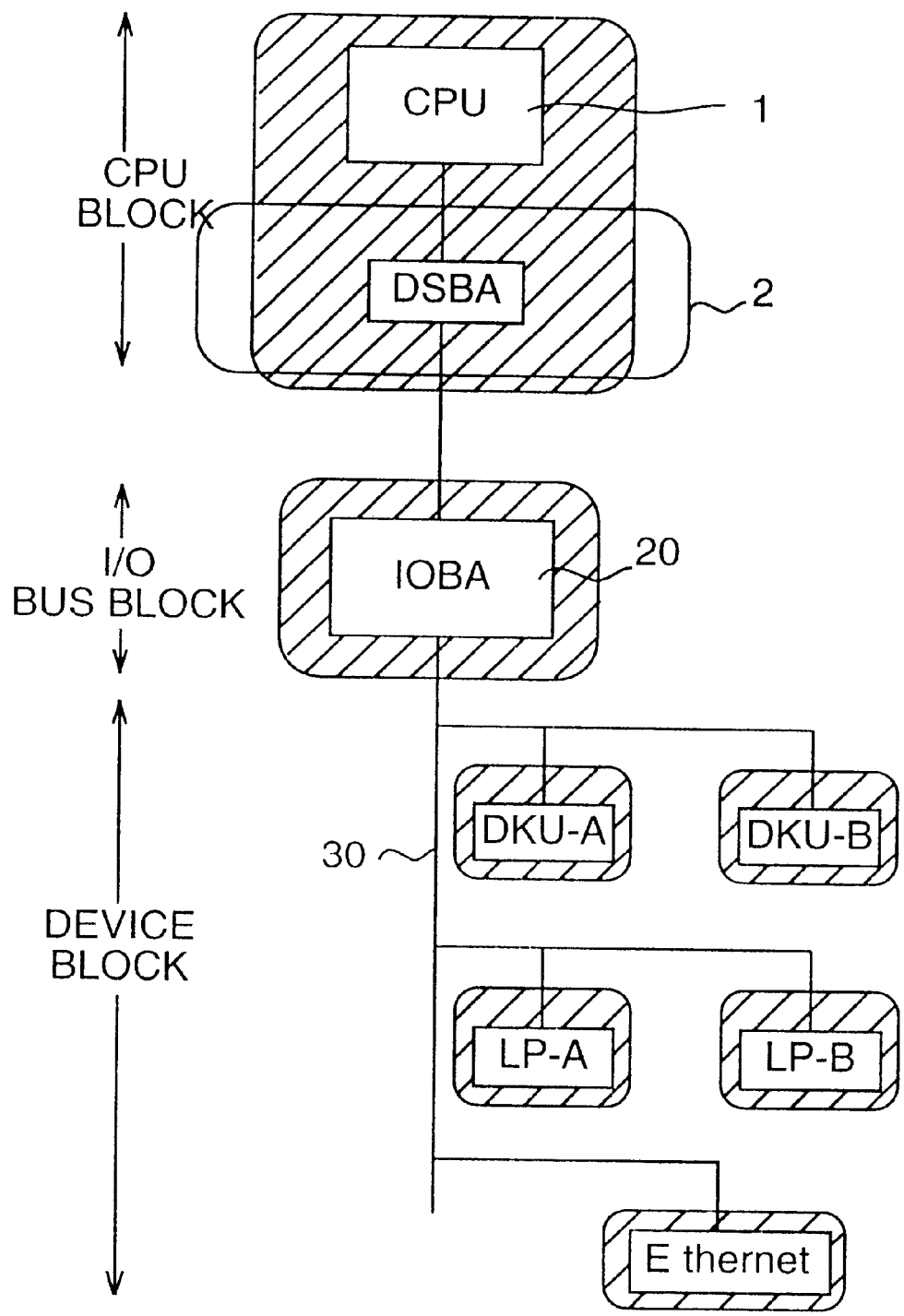
FIG. 1 is a conceptual view of a computer system embodying the invention, comprising one CPU block and one I/O bus block.

FIG. 1 is a conceptual view outlining a basic constitution of a computer system embodying the invention, including only one CPU and one I/O bus constituting a single CPU, single I/O bus structure. In FIG. 1, a central processing unit (CPU) 1 includes a processor, a memory, and peripheral control circuits associated therewith. An input/output bus adapter (IOBA) 20 connects an input/output bus (I/O bus) 30 to disk units (DKU), line processors (LP), and other devices, as well as to computer networks such as LANs. Between the CPU 1 and the IOBA 20 is a connecting module 2, which is a dual system bus adapter (DSBA). The DSBA in FIG. 1 works as a single-structure connecting module because there exist only one CPU and one I/O bus.

The DSBA monitors the access of the CPU 1 to the IOBA 20. If the access fails to terminate normally, the DSBA reports an access fault to the CPU 1. If the CPU 1 executes a read access instruction that fails to terminate normally, the DSBA returns fixed-pattern data to the CPU 1. When the CPU 1 determines that the read data are fixed-pattern data, the CPU 1 recognizes an I/O fault. This prevents the CPU 1 from admitting incorrect data which, if used, can destroy system resources such as memory contents.

Figure 2:
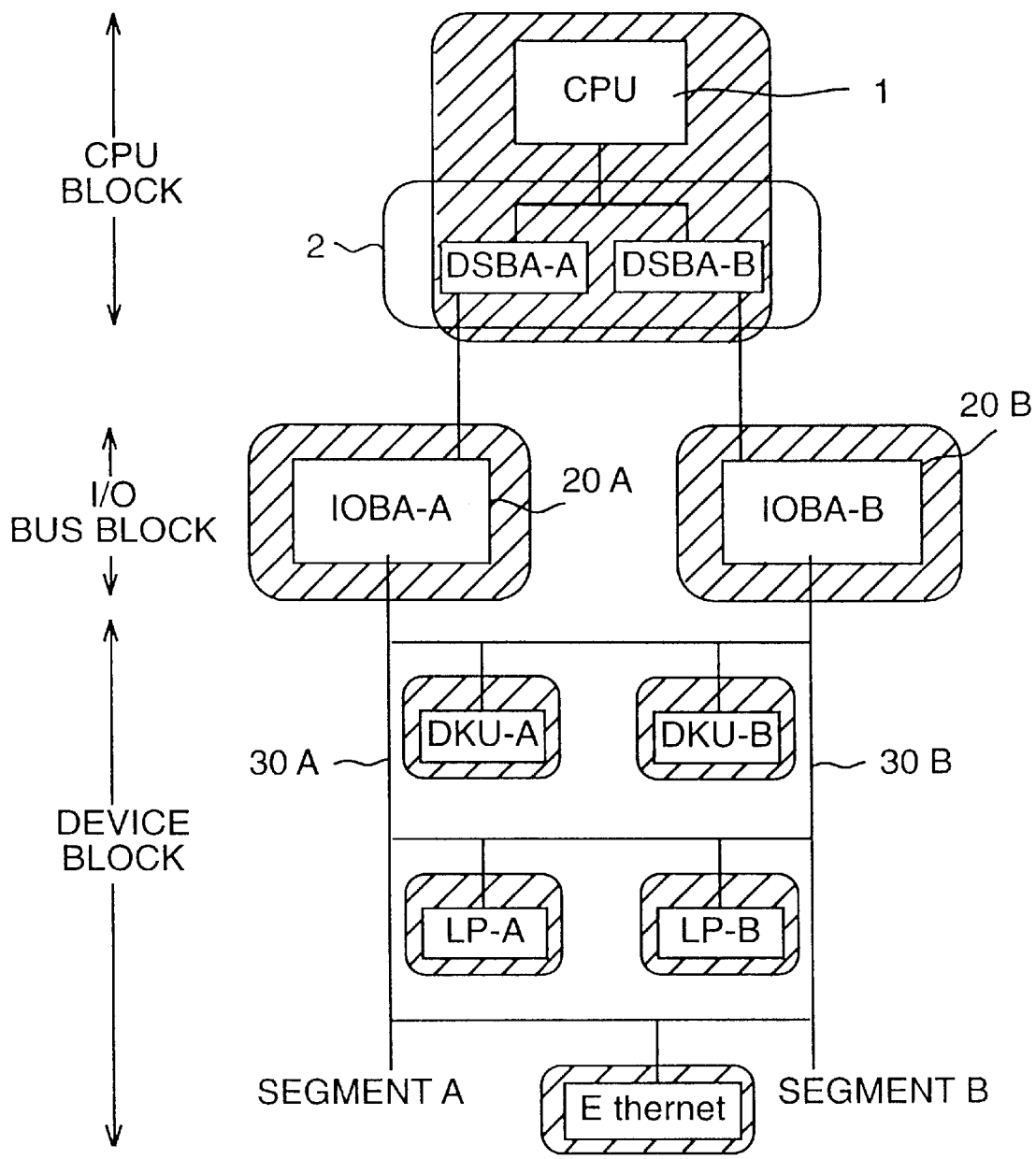
FIG. 2 is a conceptual view of another computer system embodying the invention, comprising one CPU block and two I/O bus blocks.

FIG. 2 is a conceptual view of another computer system embodying the invention, comprising one CPU and two I/O bus segments A and B in a single CPU, dual I/O bus structure. In FIG. 2, the CPU 1 is identical to that of FIG. 1. An IOBA 20A is provided on the side of the I/O bus segment A (IOBA-A), and an IOBA 20B on the side of the I/O bus segment B (IOBA-B). Input/output modules (DKU, LP, etc.) are connected physically to two I/O buses 30A and 30B of the two bus segments A and B. The connecting module 2 is made up of a dual system bus adapter A (DSBA-A) and a dual system bus adapter B (DSBA-B) connected respectively to the IOBA 20A and IOBA 20B. The CPU 1 is connected to both the DSBA-A and DSBA-B. Alternatively, only one DSBA may be provided, and two I/O boards may be furnished for the I/O bus and connected to the IOBA 20A and IOBA 20B.

The DSBA-A and DSBA-B monitor the access of the CPU 1 to the IOBA 20A or IOBA 20B. If the CPU 1 issues an I/O read access command for a read operation via the bus segment A or B that fails to terminate normally, the DSBA returns fixed-pattern data to the CPU 1. When the read data are found to be fixed-pattern data, a fault is recognized in the current I/O bus segment. If a fault occurs in the IOBA or on the I/O bus of either the bus segment A or B, the DSBA severs the logical connection between the faulty I/O bus segment and the input/output modules. This allows the CPU 1 to continue the access to the I/O devices using the I/O bus on the fault-free bus segment side.

Figure 3:
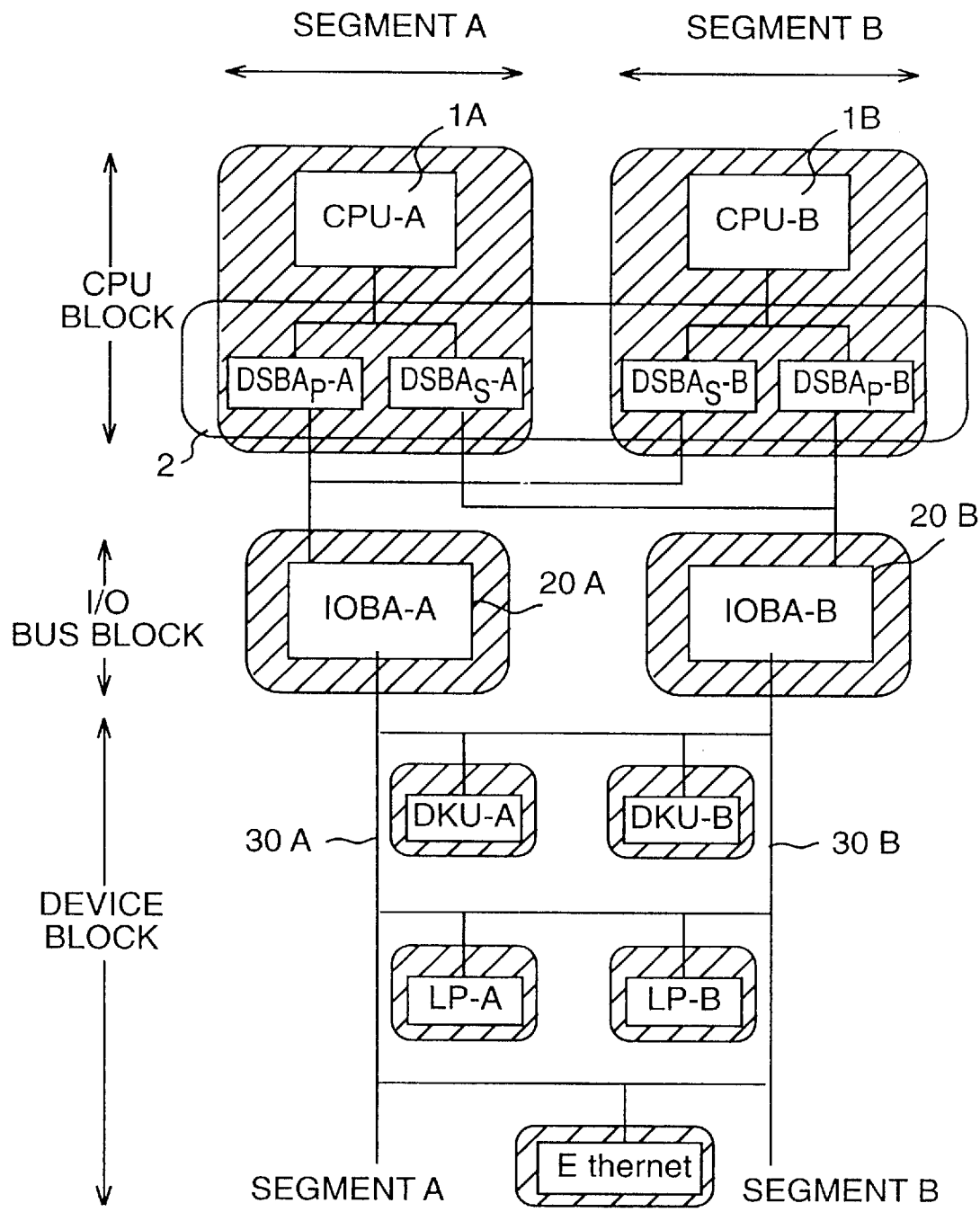
FIG. 3 is a conceptual view of another computer system embodying the invention, comprising two CPU blocks and two I/O bus blocks.

FIG. 3 is a conceptual view of another computer system embodying the invention, comprising two CPUs 1A, 1B and two corresponding I/O bus segments A, B constituting a dual CPU, dual I/O bus structure. When normally operating, the CPUs 1A and 1B execute the same program in the same sequence in synchronism with a clock signal of the same frequency and phase. The I/O bus segments are the same as those in FIG. 2. The IOBA 20A and I/O bus 30A constitute the segment A, and the IOBA 20B and I/O bus 30B make up the segment B. The connecting module 2 comprises DSBAp-A and DSBAs-B constituting a first DSBA pair (first dual system bus adapter) and DSBAp-B and DSBAs-A making up a second DSBA pair (second dual system bus adapter). In this setup, the DSBAp-A and DSBAp-B are called primary DSBAs, and the DSBAs-A and DSBAs-B are called secondary DSBAs.

The primary DSBAp-A and secondary DSBAs-B receive I/O access commands respectively and simultaneously from the CPUs 1A and 1B regarding the I/O bus segment A. In this case, the primary DSBAp-A alone is allowed to transmit the command to the IOBA 20A. A response from the IOBA 20A is received by both the DSBAp-A and DSBAs-B which in turn forward the response to the CPUs 1A and 1B, respectively. Likewise, the primary DSBAp-B and secondary DSBAs-A receive I/O access commands respectively and simultaneously from the CPUs 1A and 1B regarding the I/O bus segment B. In this case, the primary DSBAp-B alone is allowed to transmit the command to the IOBA 20B. A response from the IOBA 20B is received by both the DSBAp-B and DSBAs-A which in turn forward the response to the CPUs 1A and 1B, respectively.

The operations above apply when the CPUs 1A and 1B both operate normally. However, if the CPU 1A fails, for example, the secondary DSBAs-B transmits an I/O access command regarding the segment A from the CPU 1B to the IOBA 20A. A response from the IOBA 20A is returned via the secondary DSBAs-B to the CPU 1B. Regardless of the CPU 1A being normal or faulty, though, the primary DSBAp-B transmits an I/O access command regarding the segment B from the CPU 1B to the IOBA 20B and forwards a response from the IOBA 20B to the CPU 1B. Likewise, if the CPU 1B fails, the DSBAp-A and DSBAs-A take over communications between the normal CPU 1A and the I/O bus segments A and B, respectively. In this manner, the normal CPU processes I/O access commands continuously with respect to the two I/O bus segments A and B.

As with the DSBAs in FIGS. 1 and 2, the primary and secondary DSBAs constituting the connecting module 2 monitor the access of the CPU 1A or 1B to the IOBA 20A or 20B. If the current access fails to terminate normally, the DSBA in charge reports an access fault to the currently operating CPU 1A or 1B. If the access that failed to terminate normally is for a read operation, fixed-pattern data are returned to the CPU 1A or 1B. The fixed-pattern data cause the CPU 1A or 1B to recognize the occurrence of the fault in the segment A or B.

Suppose that a fault has occurred in the IOBA 20A or on the I/O bus 30A in the segment A. In this case, the CPU 1A orders the DSBAp-A to sever the logical connection between the I/O bus 30A and the input/output modules connected thereto. Thereafter, the fault-free IOBA 20B and I/O bus 30B are used to continue the access to the input/output modules. In the setup above, the secondary DSBAs-A and primary DSBAp-B receive I/O access commands simultaneously and respectively from the CPUs 1A and 1B with respect to the I/O bus segment B. Only the primary DSBAp-B is allowed to transmit the received I/O access command to the IOBA 20B. A response from the IOBA 20B is received by both the DSBAp-B and DSBAs-A, which in turn forward the response to the CPUs 1A and 1B, respectively. The operation involved is the same as that in effect when the CPUs 1A and 1B are both normal.

The system configuration in FIG. 3 constitutes a fully dual hardware structure for ensuring high reliability against a one-shot hardware fault. The structure is made up of disconnectable units called blocks, each having an error detecting capability. As shown in FIGS. 1 through 3, the hardware structure is generally composed of three kinds of blocks. In the configuration of FIG. 3, each of the blocks is divided into the segments A and B to make up the dual structure. Thus there are six blocks in the configuration of FIG. 3.

In the configuration of FIG. 3, the corrective measures taken against a fault are characterized by the sharing of the task of disconnecting any of the dual-structure blocks by hardware and software. Specifically, the CPU blocks (including CPUs, memories, system bus, DSBAs, etc.) are connected in a hardware-based dual structure, whereas the I/O bus blocks (with IOBAs, I/O bus, IOA, LANC, etc.) and the device blocks (comprising DKUs, LPs, LAN, etc.) are put in a software-based dual structure connection. If an error is detected in one CPU block, the faulty block is disconnected by hardware and the remaining normal block maintains uninterrupted processing. In case of an error in one I/O bus block or device block, the defective block is disconnected by software and the remaining normal block continues the processing. Thus, from the viewpoint of the software in charge of I/O bus control, there exist two I/O bus segments A and B with independent addresses. A flag in memory indicates which of the I/O bus segments is normal. According to that flag, the two I/O bus segments and the devices are suitably combined to overcome a one-shot I/O fault and thereby to keep the operation uninterrupted.

The DSBAs monitor access and return fixed-pattern data to the CPU if a read access attempt fails to terminate normally. Using an appropriate program, the CPU checks to see if the returned data indicate an I/O bus adapter fault. The I/O bus adapter fault, if detected and so indicated, is prevented from reaching the CPU. Further, the DSBAs forcibly sever the logical connection between the I/O bus segments and the input/output modules. In the event of an I/O bus segment fault, the disconnecting means disconnects reliably the failed I/O bus segment. It should be noted that the DSBAs are installed not in the fast-operating CPU portion requiring sophisticated packaging technology but in the low-speed interface portion associated with I/O bus adapters. This allows the CPUs and I/O bus adapters to be shared by ordinary data processors, workstations, or personal computers without degrading system performance.

The following description will center on details of the fully dual system of FIG. 3, the most complex of the three embodiments outlined with reference to FIGS. 1 through 3 above. The setups of FIGS. 1 and 2 may be implemented simply by omitting part of the components or functions constituting the embodiment of FIG. 3.

Figures 4A, 4B:
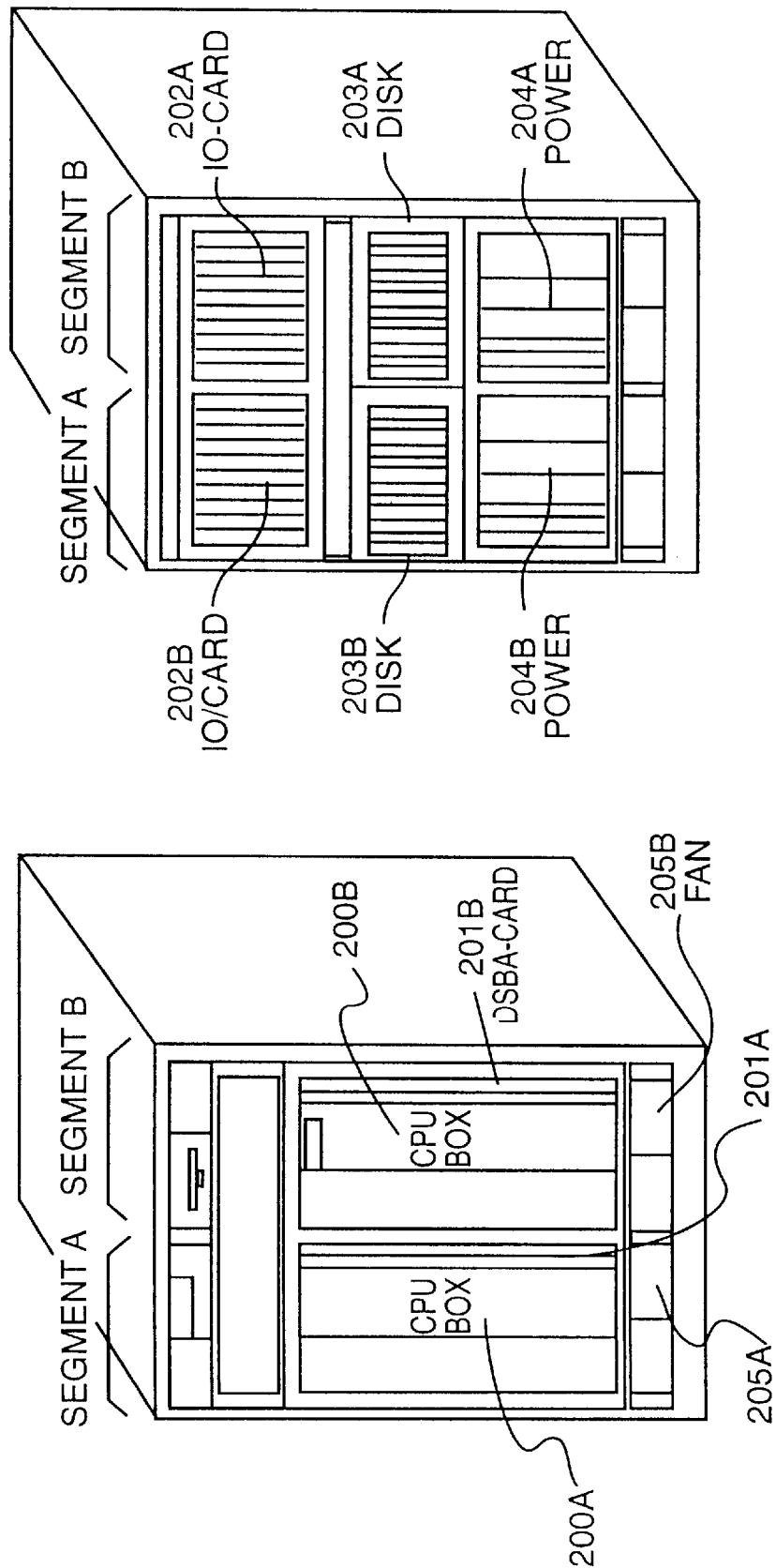
FIGS. 4(A) and 4(B) are external views of a fault-tolerant computer system embodying the invention.

FIGS. 4(A) and 4(B) are external front and rear views, respectively, of a fault-tolerant computer system embodying the invention in a fully dual structure. Reference numerals 200A and 200B denote CPU boxes comprising processors and memories. Alongside the CPU boxes 200A and 200B are DSBA cards 201A and 201B for the segments A and B, respectively. Reference numerals 202A and 202B represent I/O cards including IOBAs, IOAs, and related components, and 203A and 203B indicate disk units. The disk units may be arranged to form a mirror disk structure as needed to ensure higher reliability. Power supplies 204A and 204B power the segments A and B, respectively, and cooling fans 205A and 205B are cooling fans cool the segments A and B, respectively.

As outlined, all hardware modules necessary for system operation are arranged in a dual structure. In case of a one-shot hardware fault, the faulty module is disconnected from the configuration so as to ensure continuous operation. Where the hardware is implemented as illustrated in FIGS. 4(A) and 4(B), the segments A and B are physically separated from each other to emphasize the dual structure. This minimizes human error during maintenance work and readily permits extensive inspections, including back board cleaning.

Figure 5:
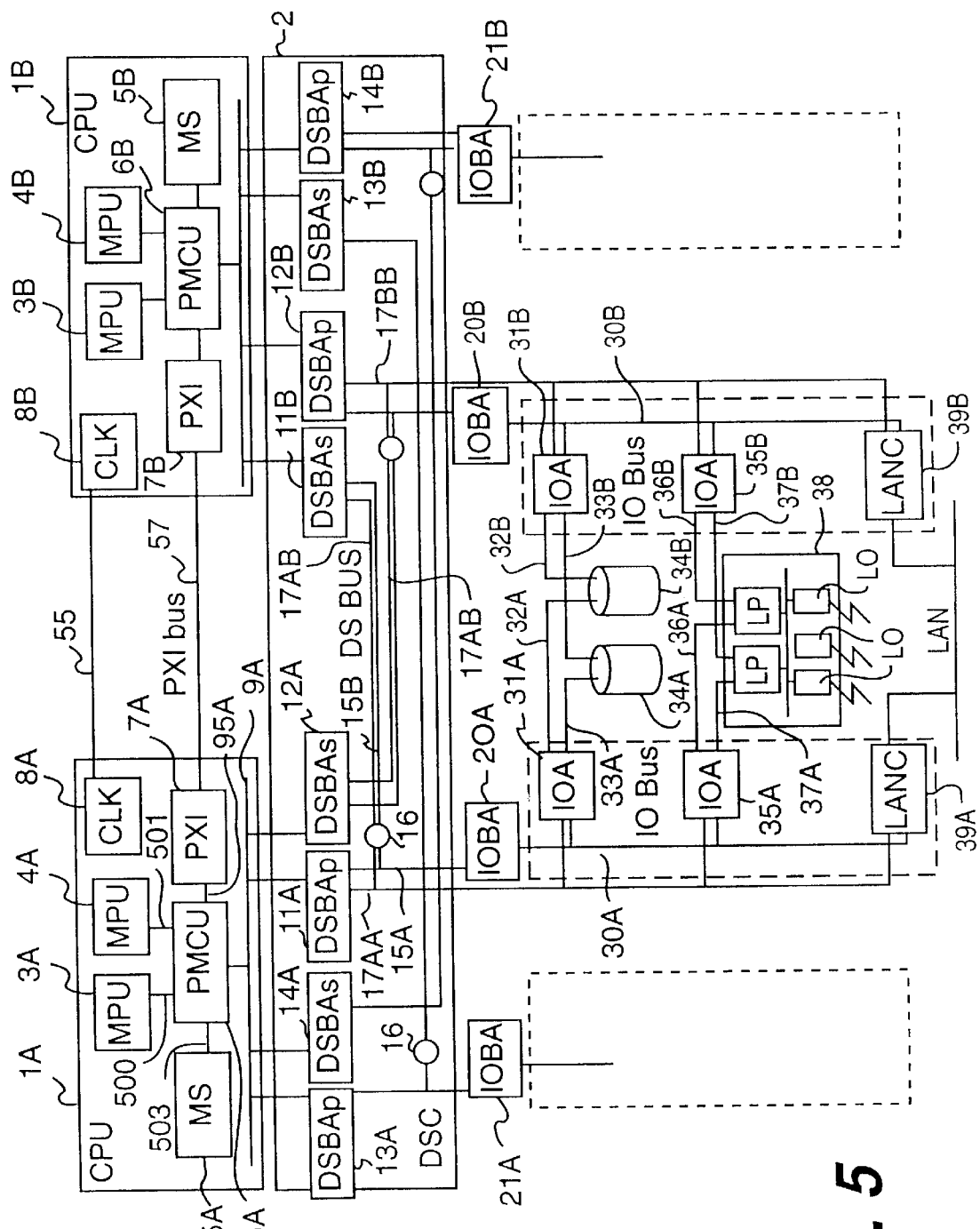
FIG. 5 is a schematic block diagram detailing the system configuration shown in FIG. 3.

FIG. 5 is a schematic block diagram detailing the conceptual view of the system configuration shown in FIG. 3. In FIG. 5, the left-hand half portion stands for the segment A and the right-hand half for the segment B. Because the two segments are structurally identical, the segment A in the left-hand half of the view will primarily be described below.

A central processing unit (CPU) 1A in the segment A comprises processors 3A and 4A, a memory 5A, a processor memory control unit 6A, an interprocessor interface controller 7A, a clock circuit 8A, and a system bus 9A. The processors (MPUs) 3A and 4A have identical cache memories and operate identically in the normal state. That is, a dual processor structure is in place. The memory (MS) 5A stores instructions and data. The memory is known to come in various capacities and structures which, however, will not be discussed here because they are not necessary to understanding the invention. The processor memory control unit (PMCU) 6A connects the processors 3A and 4A to the memory 5A and system bus 9A.

In operation, the processor memory control unit 6A mainly transmits the access command from the processor 3A or 4A to the memory 5A or system bus 9A, and transmits the access command from the system bus 9A to the memory 5A. Furthermore, the processor memory control unit 6A compares output signals 500 and 501 from the processors 3A and 4A to see if the outputs from the two processors match. A mismatch between the processor outputs causes the processor memory control unit 6A to detect a processor fault.

The interprocessor interface controller (PXI) 7A controls exchanges between the CPUs 1A and 1B via a signal line (PXI bus) 57 for transfer of information such as the CPU status. The clock circuit (CLK) 8A has an oscillator which, in cooperation with a clock circuit 8B of the segment B, supplies a clock timing signal of the same frequency and phase to the entire segment A via a signal line 55. The clock circuit 8A also includes a halt detecting circuit for detecting an oscillator halt.

The connecting module 2 is a dual system bus adapter (DSBA) setup that controls a DS (dual system) bus connecting the CPUs and IOBAs of the segments A and B. In this embodiment, the connecting module 2 is composed of four pairs of DSBAs, i.e., DSBAp 11A paired with DSBAs 11B, DSBAs 12A paired with DSBAp 12B, DSBAp 13A paired with DSBAs 13B, and DSBAs 14A paired with DSBAp 14B. The pair of DSBAp 11A and DSBAs 11B are connected to the I/O bus of the segment A, while the pair of DSBAs 12A and DSBAp 12B are connected to the I/O bus of the segment B. The same connective relation applies to the other pairs.

Because all pairs of DSBAs operate identically, the pair of DSBAp 11A and DSBAs 11B alone will now be described. The DSBAp 11A is defined as a primary DSBA and the DSBAs 11B as a secondary DSBA. As discussed with reference to FIG. 3, the primary and secondary DSBAs receive I/O bus access commands simultaneously and respectively from the CPUs 1A and 1B. Usually, only the primary DSBA is allowed to transmit the access command from the CPU to the I/O bus. An access response from the DS bus is received simultaneously by both the primary and second DSBAs, which transmit the response to the CPUs 1A and 1B at the same time.

A bus switch 16 connects and disconnects a DS bus 15A of the segment A and a DS bus 15B of the segment B. The bus switch 16 is preferably an MOS switch which has a minimum of delays and which is fabricated by the C-MOS process. Turning off the bus switch 16, which is usually kept on-line, separates the segment A from the segment B both logically and electrically. This makes it easier for components to be replaced in the on-line operating state. The bus switch 16 may be turned on and off either manually or by command. Signal lines 17AA and 17AB are used to disconnect logically the I/O devices from the I/O bus.

Input/output bus adapters (IOBAs) 20A and 21A connect the DS bus of the segment A to the I/O bus. In this embodiment, the IOBA 20A is coupled to the I/O bus 30A. In turn, the I/O bus 30A is connected via I/O adapters (IOAs) 31A and 35A to standard I/O device buses 32A, 33A, 36A, and 37A, exemplified by the SCSI (Small Computer System Interface) bus.

The I/O device buses are connected to disk units 34A and 34B as well as to line processors (LPs) 38A and 38B. The disk units 34A and 34B may be arranged to constitute a mirror disk structure, illustratively, by use of software. Alternatively, other disk unit configurations of high reliability may be adopted. The line processors (LPs) 38A and 38B are connected via line controllers (LCs) to public communication lines. In addition, the I/O bus 30A is connected to a local area network controller (LANC) for linking up with local area networks (LANs) such as the Ethernet and FDDI. Likewise, the disk units, line processors and LANs are connected to the I/O bus 30B of the segment B.

With this embodiment, the IOBAs 20A and 20B are recognized as I/O bus blocks having different addresses from a software point of view, and the input/output adapters are each recognized as a different I/O adapter from the viewpoint of software. Thus, appropriately arranging software parameters makes it possible to implement fault-tolerant computer systems of various grades in a flexible manner. For example, whereas FIG. 5 shows the dual structure example in which the I/O buses and I/O adapters are all furnished in a dual setup, it may be desired to implement an alternative computer system in which I/O adapters of lesser importance are formed in a single-unit structure so as to reduce the system costs. Another alternative may be a system wherein disk units accommodating critically important data are arranged to constitute a quadruple structure.

Key components of the embodiment in FIG. 5 will now be described in more detail.

Figure 6:
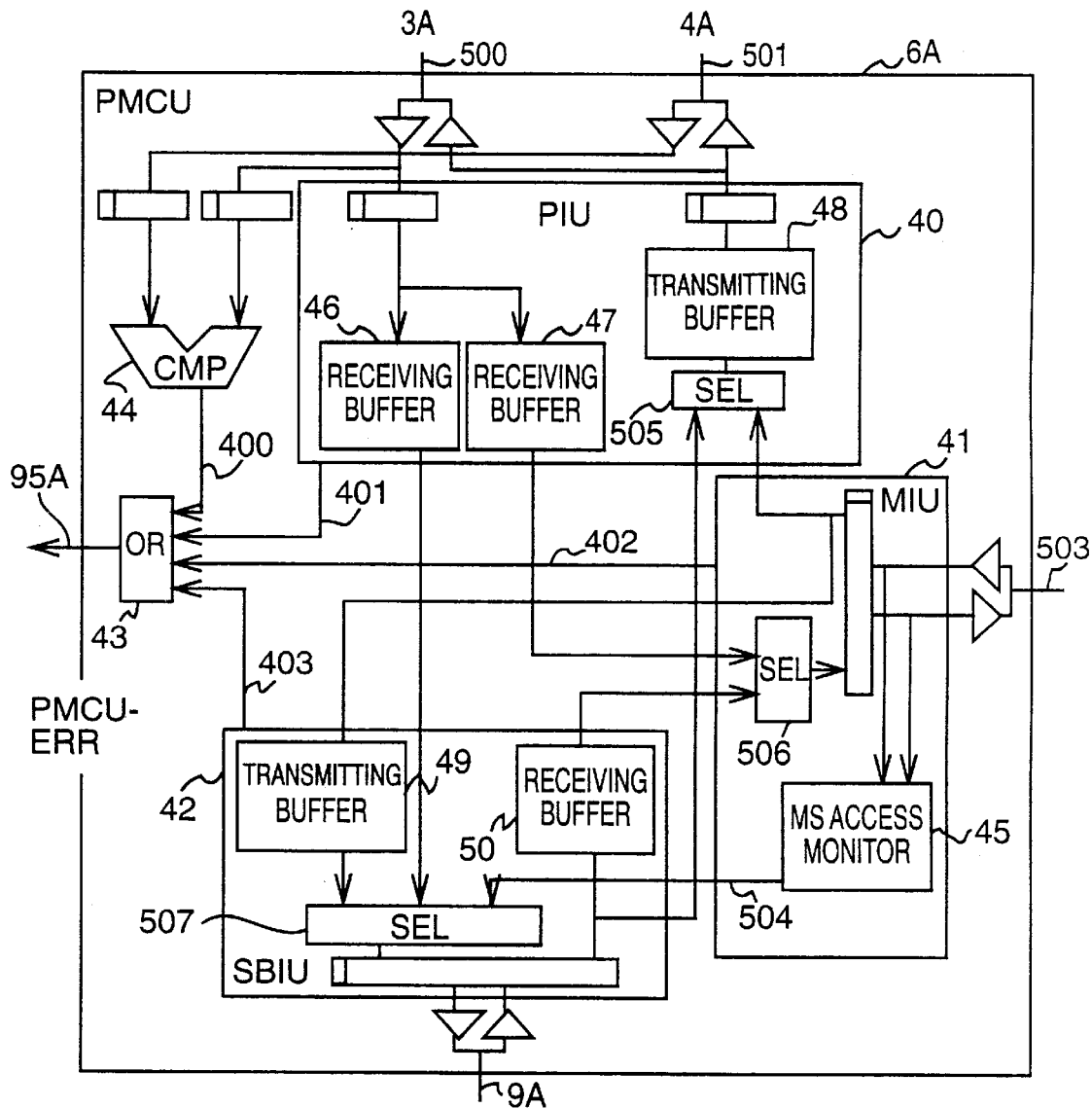
FIG. 6 is a detailed block diagram of the processor memory control unit (PMCU) of FIG. 5.

FIG. 6 is a detailed block diagram of the processor memory control unit (PMCU). Because the PMCUs 6A and 6B are identically structured, the description below will center on the PMCU 6A on the side of the CPU 1A for illustrative purposes.

The PMCU 6A is composed primarily of a processor interface unit (PIU) 40, a memory interface unit (MIU) 41, a system bus interface unit (SBIU) 42, and a processor output comparator 44.

The PIU 40 is an interface unit for the processors 3A and 4A. When the processor-originated external access constitutes access to memory, the PIU 40 places the relevant memory address and data from the master processor (assumed here to be 3A) into a receiving buffer 47 via a signal line 500. Where external access from the processor is access to the I/O bus (PIO access), the PIU 40 places the relevant memory address and data into a receiving buffer 46. Meanwhile, a memory address and data from the slave processor (assumed to be 4A) are admitted into the PMCU 6A via a signal line 501 but not into the receiving buffer 46 or 47.

When the master processor 4A issues a write access command, the processor output comparator 44 compares the addresses and data from the master and slave processors 3A and 4A. In case of a mismatch in the comparator 44, a master-slave error signal 400 is asserted. Any parity error or control circuit error that may be detected during the operation of the PIU 40 is transmitted to an OR element 43.

The MIU 41 has its selector 506 receive a memory access command from the PIU 40 and a DMA access command from the SBIU 42 (to be described later), gains access to the memory 5A via a signal line 503, and returns the response to the PIU 40 or SBIU 42. The access command received by the MIU 41 from the PIU 40 is for a memory read or memory write operation. If a memory read command is issued, the read address held in the receiving buffer 47 is transmitted to the memory 5A via the selector 506. The data read from the memory 5A are placed into a transmitting buffer 48 via a selector 505 and returned from there to the master and slave processors 3A and 4A. In the event of a memory write command, the read address and write data held in the receiving buffer 47 are written to the memory 5A via the selector 506.

The access command received by the MIU 41 from the SBIU 42 is for a DMA read or DMA write operation. When a DMA read command is issued, the read address held in the receiving buffer 50 is sent to the memory 5A via the selector 506. The data read from the memory 5A are placed into a transmitting buffer 49 and returned via the system bus 9A to the I/O bus side. If a DMA write command is issued, the read address and write data held in the receiving buffer 50 are written to the memory 5A via the selector 506.

The manner in which to control the selector 506, though not specifically indicated here, should preferably give priority to the SBIU 42. Any parity error or control circuit error detected during the operation of the MIU 41 is transmitted to the OR element via a signal line 402. An MS access monitor 45 monitors read/write access of the MIU on the normal side during a memory copy operation (to be described later in detail), and receives an address and data as needed. The received address and data are output onto a system bus 94A via a signal line 504 as the memory access command. The address and data are then passed through the paired DSBA and written to the memory of the other side.

The SBIU 42 processes the DMA access command from the system bus 9A and the PIO access command from the PIU 47. When a PIO read access command is issued by the PIU 40, the SBIU 42 acquires the system bus access right and then outputs the address held in the receiving buffer 46 onto the system bus 9A via the selector 507. The read data from an input/output module are placed into the transmitting buffer 48 via the selector 505 and returned from there to the master and slave processors 3A and 4A.

When a PIO write command is issued by the PIU 40, the SBIU 42 likewise acquires the system bus access right and outputs the write address and write data held in the receiving buffer 46 onto the system bus 9A via the selector 507. What takes place in the event of a DMA read/write access command being sent from the system bus 9A was already discussed in connection with the MIU 41. Any parity error or control circuit error detected during the operation of the SBIU 42 is transmitted to the OR element 43 via a signal line 403.

The OR element 43 asserts a signal line (PMCU-ERR) 95A and notifies the interprocessor interface controller (PXI) 7A thereof if any error is detected during the operation of the PMCU 64, i.e., if any one of the signal lines 400 through 403 is set to a logical "1."

FIG. 7 is a detailed block diagram showing a typical internal structure of the clock circuits 8A and 8B in the CPUs 1A and 1B and their connective relations. Because the clock circuits 8A and 8B are identically structured, the description below will deal mostly with the circuit 8A. In the clock circuit 8A of FIG. 7, reference numeral 50A is a known oscillator (OSC) incorporating a crystal oscillator that outputs a clock signal 501A at a relatively low frequency of, say, 10 MHz. With the frequency of the oscillator 50A set to a relatively low level, the CPU of the segment A may be located dozens of centimeters away from the CPU of the segment B in the installation of FIG. 4 and still the two segments may be supplied with a stable clock signal.

A selector (SEL) 51A selects the clock signal either from the oscillator 50A of the current segment or from the oscillator 50B of the other segment. A phase-locked loop circuit (PLL) 52A generates a clock signal 54A, of which the frequency is n times that of the clock signal selected by the selector 51A and which is in phase with the latter signal. This high-frequency clock signal is fed to the processors and their peripheral circuits required to operate on such a clock signal.

A halt detecting circuit 53A monitors both oscillators 50A and 50B and detects a halted oscillation of the clock signal 501A or 501B. If a halted oscillation is detected, the halt detecting circuit 53A orders the selector 51A using a control signal 56A to select the output of the normal oscillator. The oscillators 50A and 50B operate in a master-slave relationship in which the initially powered oscillator acts as the clock master. For example, where the segment A is powered first, the oscillator 50A acts as the clock master, and the selectors 51A and 51B both select the clock signal 501A. If the oscillator 50A is halted, the halted oscillation is detected by the halt detecting circuits 53A and 53B causing the selectors 51A and 51B to select the clock signal 501B. The switching operation is carried out illustratively in a time period of about 300 ns, shorter than the time required for a bout of PLL-based synchronization. Thus, when the clock signals are switched, the PLL circuits 52A and 52B can supply their clock signals uninterruptedly to the processors and peripheral circuits.

Dual system bus adapters (DSBAs) connecting two CPUs with one I/O bus are described below with reference to FIGS. 8 through 14.

Figure 8:
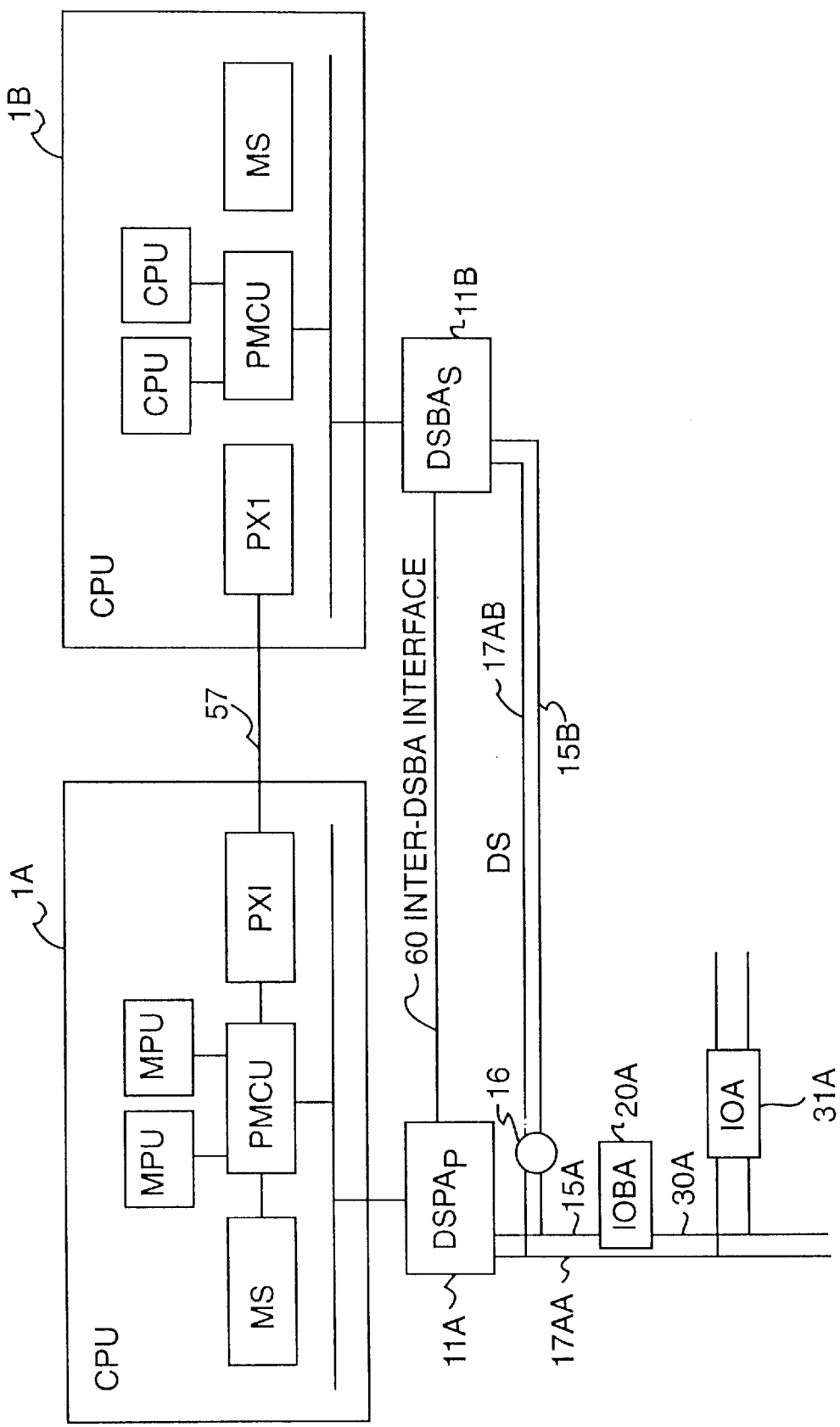
FIG. 8 is a schematic block diagram of the dual system bus adapters (DSBAs) and their surroundings.

FIG. 8 is a schematic block diagram of the dual system bus adapters (DSBAs) and their surroundings, with emphasis on control of the dual system (DS) buses. The description that follows will refer primarily to the pair of DSBAp 11A and DSBAs 11B in connection with the CPUs 1A and 1B and the I/O bus 30A of the segment A in the embodiment of FIG. 5; the described pair of DSBAs are identical in structure and operation to the other DSBA pairs.

The DSBAp 11A is defined as the primary DSBA and the DSBAs 11B as the secondary DSBA. The two DSBAp 11A and DSBAs 11B receive IODS bus access commands from the CPUs 1A and 1B simultaneously and respectively. Then, only the DSBAp 11A is allowed to transmit the CPU access command to the IOBA 20A. A response from the IOBA 20A is received via the DS bus simultaneously by the DSBAp 11A and DSBAs 11B which, in turn, transmit the response to the respective CPUs 1A and 1B at the same time. That is, the DSBAs act as a selector regarding the access commands from the CPUs, and as a distributor for the responses from the I/O bus.

While the CPUs 1A and 1B operate identically in the normal state, they go out of synchronism if a fault occurs in either of them. The out-of-sync state occurs when the two CPUs attempt to access one DS bus 15A. The DSBAp 11A and DSBAs 11B detect the out-of-sync state via an inter-DSBA interface 60, and generate a timing signal with which to disconnect the faulty CPU block.

FIG. 9 is a list of typical inter-DSBA interface signals of the inter-DSBA interface 60. Signals 61A and 61B are system bus grant signals allowing the CPUs 1A and 1B respectively to use the system bus. Signals 62A and 62B are the bus request signals which are generated by the respective DSBAs. Signals 63A and 63B are error signals indicating that the respective DSBAs have detected errors. Although a typical constitution of the DSBA shown in FIG. 10 does not have any error detection code feature such as a parity bit function added to the inter-DSBA interface 60, it is evident that such a feature may be readily added to the structure where necessary, as indicated in FIG. 9.

Figure 10:
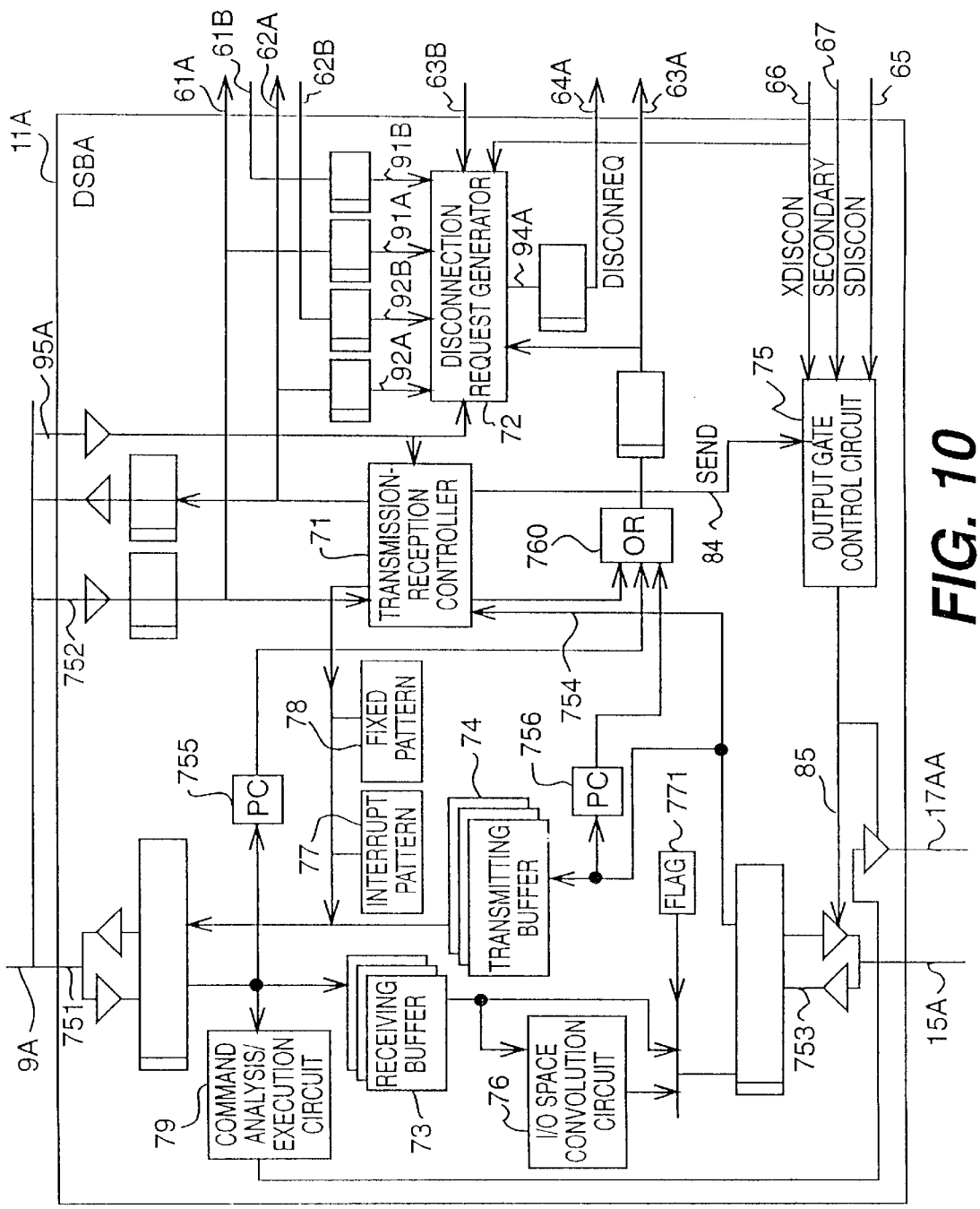
FIG. 10 is an overall block diagram of a DSBA.

FIG. 10 is an overall block diagram of the internal structure of the DSBAp 11A. Although the DSBAs operate differently depending on whether they are primary or secondary, they are all implemented using the same hardware. Thus, for illustrative purposes, the description that follows will center on the primary DSBAp 11A connected to the CPU 1A of the segment A.

Signals on the system bus 9A include a data/address signal 751 and control signals 752 such as a read/write signal. Likewise, signals on the DS bus 15A include a data/address signal 753 and control signals 754. A receiving buffer 73 stores addresses and data from the system bus 9A, and a transmitting buffer 74 accommodates addresses and data from the DS bus 15A.

The access commands processed by the DSBA are those of access from the CPU to the I/O adapters (PIO read access and PIO write access) and of access from the I/O adapters to the memory (DMA read access and DMA write access). When a PIO read access command is issued, the read address on the signal line 751 is placed into the receiving buffer 73 and forwarded from there to the DS bus 15A. The data read from the I/O adapter side are placed temporarily in the transmitting buffer 74 before being sent to the CPU via the signal line 751. If a PIO write access command is issued, the write address and write data on the signal line 751 are placed into the receiving buffer 73 and output from there onto the DS bus 15A. The data are then written to the I/O adapter designated by the address.

If a DMA read access command is issued, the read address on the signal line 753 is placed into the transmitting buffer 74. The memory (MS) is accessed by use of this address. The data read from the memory are placed temporarily into the receiving buffer 73 before being output onto the DS bus 15A. A response of the PMCU is returned to the DMA access source. If a DMA write access command is issued, the write address and write data on the signal line 753 are placed into the transmitting buffer 74 and sent from there to the system bus 9A. The PMCU writes the data to the memory using that address.

A transmission-reception controller 71 receives control signals 752 and 754 to manage the buffers 73 and 74, and controls the transmission of addresses and data to the system bus 9A or DS bus 15A. The transmission-reception controller 71 monitors access attempts on the DS bus 15A and, if an access attempt fails to terminate normally, outputs an interrupt transaction data pattern 77 onto the system bus 9A to notify the CPU 1A of an access fault. If the access that failed to terminate normally is for a read operation, the transmission-reception controller 71 sends fixed-pattern data 78 to the system bus 9A after placing the interrupt transaction data pattern 77 onto the system bus 9A. The fixed-pattern data 78 are sent as return data to the CPU 1A.

The program operating on the processors in the CPU 1A issues an I/O read access command when it is necessary to verify whether the I/O access command has normally terminated. A check is then made to see if the read data match the fixed-pattern data. The result shows whether a fault has occurred, and serves to prevent the program from destroying the memory contents of the two segments by using the erroneous input data.

The access attempts are monitored on the DS bus 15A not only for a DS bus parity error and the like occurring instantaneously upon access, but also for a PIO read time-out. The feature of PIO read time-out detection is important because it prevents system downtime by causing the DSBA to return the fixed-pattern data 78 to the CPU 1A as return data reflecting an abnormal end of the I/O access due, illustratively, to an I/O adapter fault. An I/O space convolution circuit 76 converts the PIO access address held in the receiving buffer 73 into the address of or within an I/O adapter under control of the current DSBA. A flag 771 designates the selection of whether or not to enable the output of the I/O space convolution circuit 76. As one of the control registers inside the DSBA, the flag 771 is set by software when the DSBA paired with the current DSBA has failed.

Address conversion by the I/O space convolution circuit 76 is carried out as follows. Addresses F0000000 through F7FFFFFF are assigned to the I/O adapters in side A, while addresses F8000000 through FFFFFFFF are assigned to the I/O adapters in side B. Paired I/O adapters have the same offset from address F0000000 and address F8000000, respectively. Addresses of the I/O adapter in side A are transformed to addresses of the paired adapter in side B, and vice versa, by inverting bit 4 (where bit 0 is the most significant bit). In other words, the I/O space convolution circuit 76 transmits the values of bit 0 through bit 3 and bit 5 through bit 31, and inverts the value of bit 4.

While this embodiment has been shown to have dual-structure I/O adapters all controlled by software, the I/O space convolution circuit 76 eliminates the need for changing addresses with respect to specific software (e.g., device driver) even if the I/O adapters are switched. This reduces the programming burden necessitated by dual structure control.

A command analysis/execution circuit 79 analyzes and executes each command issued by the CPU to the DSBA for a PIO write access to the register space of the DSBA. When the DSBAp 11A is in charge, it may receive a command from the CPU 1A for severing the logical connection between the I/O adapters 31A, 35A, and the LAN controller 39A on the one hand, and the I/O devices on the other. In that case, the command analysis/execution circuit 79 turns on the disconnection signal line 17AA regarding the I/O adapters 31A, 35A, and the LAN controller 39A. If the DSBAs 11B receives a command from the CPU 1B for severing the logical connection between the I/O adapters 31A, 35A, and the LAN controller 39A on the one hand, and the I/O devices on the other, the command analysis/execution circuit 79 turns on the disconnection signal line 17AB and notifies the disconnection signal line 17AA thereof.

When the DSBAs 12A is in charge in the setup of FIG. 5, it may also receive a command from the CPU 1A for severing the logical connection between the I/O adapters 31B, 35B, and the LAN controller 39B on the one hand, and the I/O devices on the other. In that case, the command analysis/execution circuit 79 turns on the disconnection signal line 17BA and notifies the disconnection signal line 17BB thereof, thereby disconnecting the I/O adapters 31B, 35B, and the LAN controller 39B. If the DSBAp 12B receives from the CPU 1B a command for severing the logical connection between the I/O adapters 31B, 35B, and the LAN controller 39B on the one hand, and the I/O devices on the other, the command analysis/execution circuit 79 turns on the disconnection signal line 17BB. The disconnection control command and the disconnection signal line associated therewith are preferably furnished individually to each of the I/O adapters. Alternatively, one set of the command and the signal line may be assigned to the group of I/O adapters 31A, 35A, and the LAN controller 39A, and another set of the command and the signal line may be allocated to the group of I/O adapters 31B, 35B, and the LAN controller 39B.

As depicted in FIG. 5, the disconnection signal lines 17AA and 17AB are provided distinct from the I/O bus signal lines (15A, 15, 30A, 30B, etc.). The I/O adapters include circuits that trigger forced logical disconnection from the I/O devices when the corresponding disconnection signal line is turned on. Thus if a fault occurs on the I/O bus or in an I/O adapter, the logical connection between the defective I/O bus or I/O adapter and the I/O devices is severed without fail. When the I/O adapter paired with its failed counterpart is connected securely to the I/O devices, the access to the I/O devices is allowed to continue unfailingly.

The disconnection control is important especially for the LANC connected to an FDDI LAN. If a faulty LANC is detected, that LANC is disconnected and the normal LANC paired therewith is admitted into the FDDI using the same MAC address as that of the defective LANC. The procedure is designed to keep the other communicating party unaware of the LANC switchover. However, because the FDDI has a duplicate address check function, the failed LANC must quit the FDDI before the newly activated LANC can successfully join the FDDI. Thus, when a disconnection signal line designates logical disconnection, the entire LANC block is reset and optical signal emission is halted to permit the failed LANC to quit the FDDI. Typical procedures will be described later.

When the I/O adapters for disk units or for line controllers are placed under disconnection control, a disconnection signal from a disconnection signal line resets the I/O adapter (IOA) in question. Thereafter, the access from the defective IOA to all I/O devices is halted so as not to disrupt the access from the newly activated IOA of the other segment to any of the I/O devices. Some I/O devices may preferably be reset as well when the IOA connected thereto is reset by the disconnection signal line. Such a setup is implemented by furnishing a plurality of disconnection signal lines for each of the segments, whereby specific I/O devices are programmed to be reset in keeping with the IOA.

Parity check (PC) circuits 755 and 756 check the addresses/data on the signal lines 751 and 753, respectively, for parity. If an error is detected, the parity check circuits 755 and 756 regard it as a parity error and send it to an OR element 760. If the transmission-reception controller 71 detects an error, it also notifies the OR element 760 thereof. If any error is detected inside the DSBA, a DSBA error signal 63A is output from the OR element 760 and transmitted to a disconnection request generator 72 which generates a request for disconnecting the current segment from the other segment. Upon detecting an error inside any DSBA or between the DSBAs, the disconnection request generator 72 generates a disconnection request signal (DISCONREQ) 64A requesting the disconnection of the failed CPU block.

The signal 64A is transmitted to the PXI of the other segment (PXI 17B).

Figure 11:
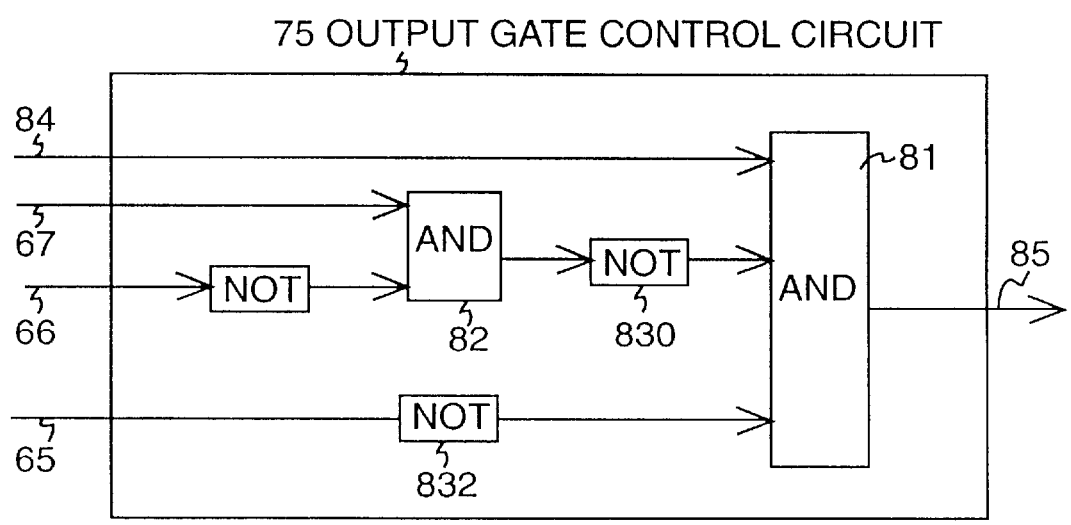
FIG. 11 is a detailed block diagram of the output gate control circuit shown in FIG. 10.

An output gate control circuit 75 controls an output gate to the DS bus 15A. FIG. 11 is a detailed block diagram of the output gate control circuit 75. In a conventional output gate control scheme, the output gate need only be opened when the transmission-reception controller 71 outputs a send signal (SEND) to the DS bus 15A. By contrast, this embodiment adopts the constitution illustrated in FIG. 11 so that the DSBA is made to operate as a dual system bus adapter.

In FIG. 11, reference numerals 81 and 82 denote AND elements, and reference numerals 830, 831, and 832 represent NOT elements. A signal line 84 carries the send signal (SEND) from the transmission-reception controller 71 to the DS bus 15A. A signal line 65 carries a disconnection signal (DISCON) indicating that the CPU block of this segment is being disconnected. A signal line 66 carries another disconnection signal (DISCON) indicating that the CPU block of the other segment is being disconnected. A signal line 67 carries a signal indicating that the secondary DSBA is in charge.

When the two CPUs are operating normally, the primary and secondary DSBAs both assert the send signal line 84. However, only the primary DSBA (with the signal line 67 negated) causes the AND element 81 to enable the signal line 85, opening the output gate to output the address/data onto the DS bus. If the CPU block of the current segment has failed and is disconnected (with the signal line 65 asserted), the signal line 65 negates the signal line 85. Thus the output gate of the current segment remains closed, disconnecting the current CPU block from the DS bus. If the CPU block of the other segment has failed and is disconnected (with the signal line 66 asserted), the signal line 85 of the secondary DSBA is asserted in accordance with the send signal 84, whereby the address and data are output onto the DS bus.

Figure 12:
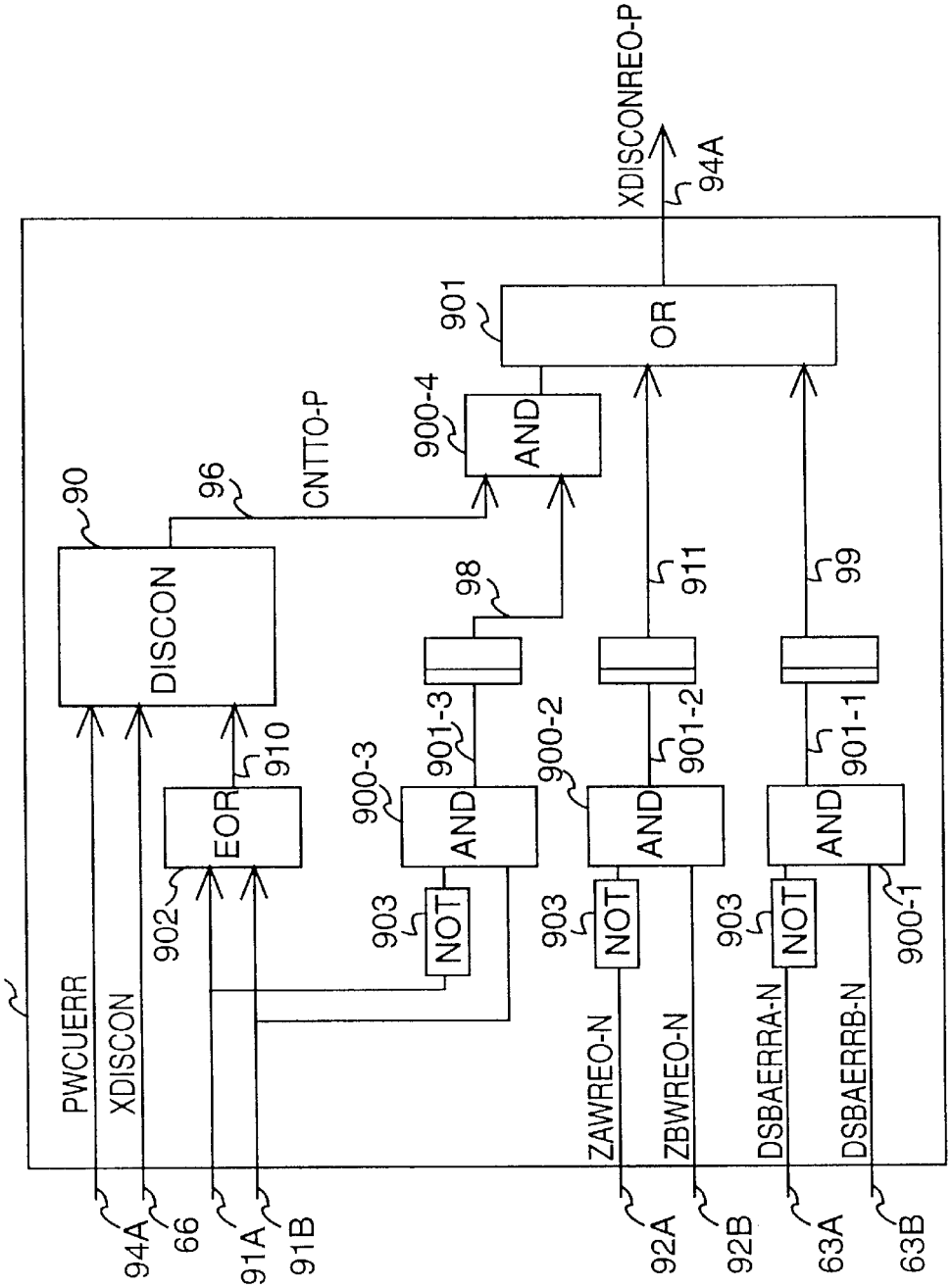
FIG. 12 is a detailed block diagram of the disconnection request generator shown in FIG. 10.

FIG. 12 is a detailed block diagram of the disconnection request generator 72. A 10-microsecond timer (counter) 90 starts counting in one of two cases: when an exclusive-OR element 902 detects a mismatch between the system bus grant signals 91A (61A) and 91B (61B) from the PMCUs of both segments, thereby asserting a signal 910; or when an error is detected in the PMCU of the current segment, with the PMCU error signal (PMCUERR) 95A asserted. The counter 90 stops counting and has its content cleared when the disconnection signal line 66 (XDISCON) is asserted to disconnect the CPU block of the other segment. Ten microseconds later, the timer 90 asserts a time-out signal 96.

Circuit 900-1 is an AND element that detects an error of the other segment. Specifically, the AND element 900-1 receives the NOT signal 63A (illustratively via a NOT element 903) and a signal 63B. When the current segment is normal and the other segment has failed, the AND element 900-1 asserts an error signal 99 regarding the other segment. This causes an OR element 901 to assert the disconnection request signal 94A (64A) regarding the CPU block of the other segment.

Circuits 900-2 and 900-3 are AND elements for detecting an out-of-sync state. Specifically, the AND element 900-2 receives the system bus request signals 92A (62A) and 92B (62B) regarding the current and the other segment, while the AND element 900-3 receives the system bus grant signals 91A (61A) and 91B (61B) regarding both segments. When the signal for the other segment is not asserted, an error is recognized and an out-of-sync error signal 911 or 98 regarding the other segment is asserted. The out-of-sync error signal 98, when generated in conjunction with the system bus grant signal, needs to be kept from immediately triggering the disconnection request signal 94A (64A), because of the risk that the CPU may already have entered an out-of-sync state for other reasons. Thus, for a certain period of time until the exact cause of the error becomes clear, an AND element 900-4 uses the output 96 of the timer 90 to mask the out-of-sync error signal 98.

Figure 13:
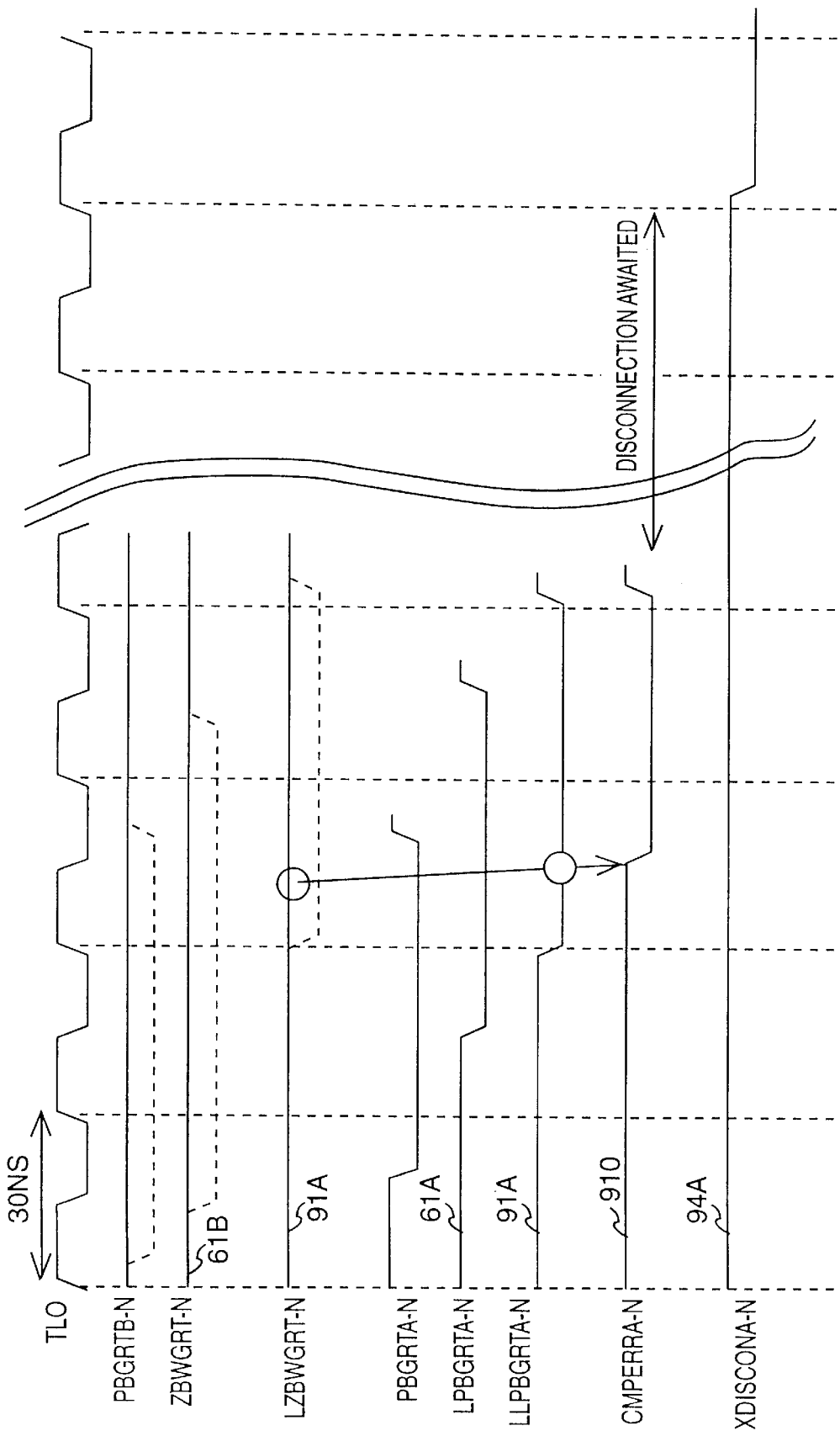
FIG. 13 is a chart of timings in effect when an out-of-sync state between system bus grant signals is detected.
Figure 14:
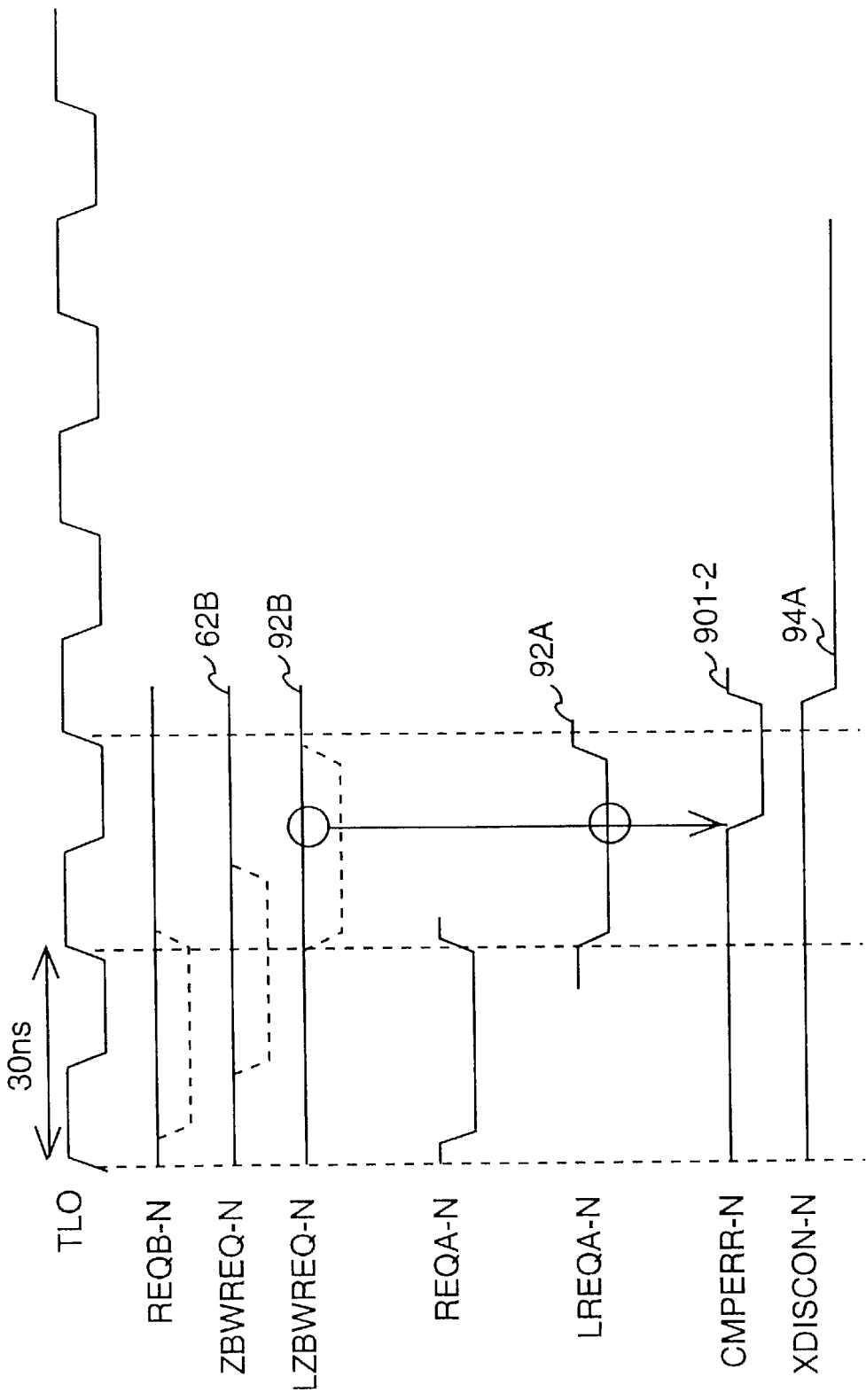
FIG. 14 is a chart of timings in effect when an out-of-sync state between system bus request signals is detected.

FIGS. 13 and 14 are charts of timings in effect from the time an out-of-sync error is detected until the signal to request the disconnection of the other CPU block is asserted.

FIG. 13 is a chart of timings in effect when the bus grant signal from the PMCU is normally output from the segment A but not from the segment B. When the absence of the bus grant signal from the segment B is detected by the disconnection request generator 72 of the DSBAp 11A of the segment A, the bus grant signal (PBGRTB-N) from the PMCU of the segment B is latched inside the DSBAs 11B. The latched signal is handed over as an inter-DSBA interface signal 61B to the DSBAp 11A of the segment A. In turn, the DSBAp 11A of the segment A generates the signal 91A by latching twice the bus grant signal from the segment A in order to maintain synchronism with the bus grant signal from the segment B. The signals 91A and 91B are compared, and a compare error signal (CMPERR-N) is asserted. For the bus grant signal from the segment A, the same proceedings are carried out in a symmetrical manner between the DSBAs 11A and 11B. In each DSBA, the compare error signal (CMPERR-N) is asserted simultaneously.

The example of FIG. 13 involves an out-of-sync state of a PMCU signal which could be attributed to some other cause of the CPU. There is a possibility that the PMCU has already issued a disconnection request. Thus there is provided a period in which to wait for the disconnection to take place. If the disconnection does not occur in the predetermined time period, the DSBA issues its own disconnection request (94A), as indicated in FIG. 13.

FIG. 14 is a chart of timings in effect when the bus request signal from the DSBA is normally output from the segment A but not from the segment B. The bus request signal (PBREQB-N) from one DSBA is transferred to the other DSBA via the inter-DSBA interface 60 in one cycle (92B). Within the DSBA of the current segment, the bus request signal is further latched so as to maintain synchronism with the bus request signal from the other segment (92A). On comparing the signals 92A and 92B, the DSBA asserts a compare error signal (CMPERR-N) and issues a disconnection request signal (94A). The disconnection request signal is transmitted as the signal 64A to the PXI 7A whereby an eventual disconnection signal is generated.

Figures 15, 16:
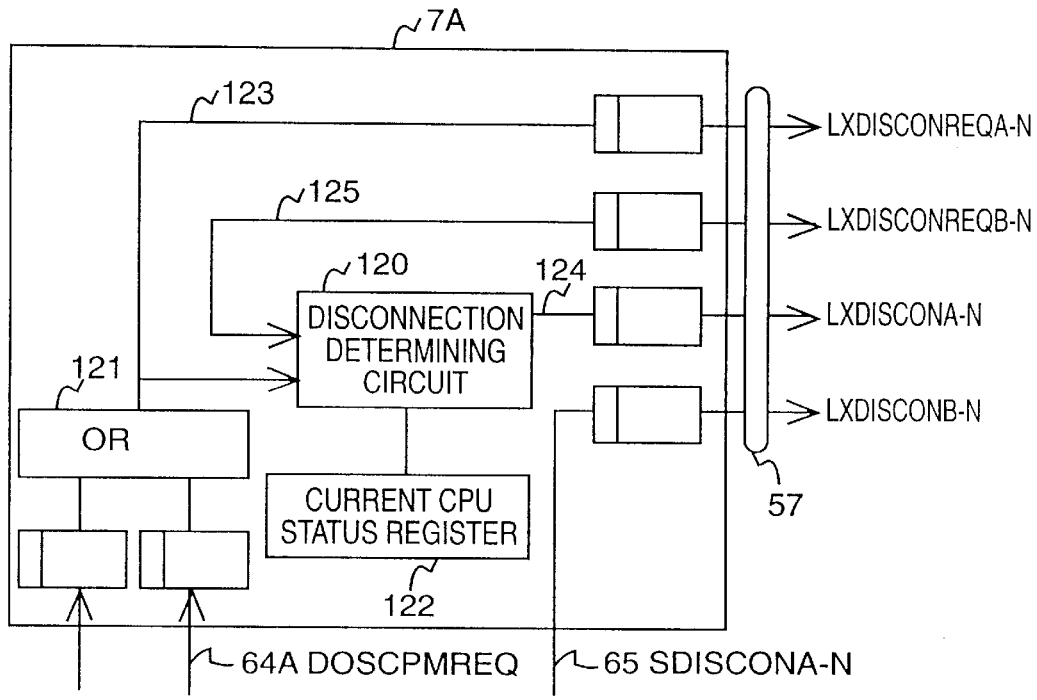
FIG. 15 is a detailed block diagram of an interprocessor interface controller (PXI)
FIG. 16 is a list of decision logic of the disconnection determining circuit of FIG. 15.

FIG. 15 is a detailed block diagram of the interprocessor interface controller (PXI) for generating a disconnection signal (XDISCON). The PXIs, structured identically, are provided one each in the segments A and B. For illustrative purposes, the PXI 7A of the segment A alone will now be described.

In FIG. 15, a disconnection request signal 64a is issued by the DSBA of the current segment to disconnect the CPU block of the other segment. Signals 57 are interface signals with respect to the PXI of the other segment. Of these interface signals, LXDISCONREQA-N is a disconnection request signal issued by the segment A to disconnect the segment B; LXDISCONREQB-N is a disconnection request signal issued by the segment B to disconnect the segment A; LXDISCONA-N is a disconnection order signal from the segment A to disconnect the segment B; and LXDISCONB-N is a disconnection order signal from the segment B to disconnect the segment A. A disconnection order signal 65 disconnects the CPU block of the current segment, the signal being generated by latching the signal LXDISCONB-N for timing adjustment. The signal 65 causes the output gate control circuit 75 of the DSBA to close the output gate so as to disconnect the current segment from the DS bus (FIG. 10).

Figure 17:
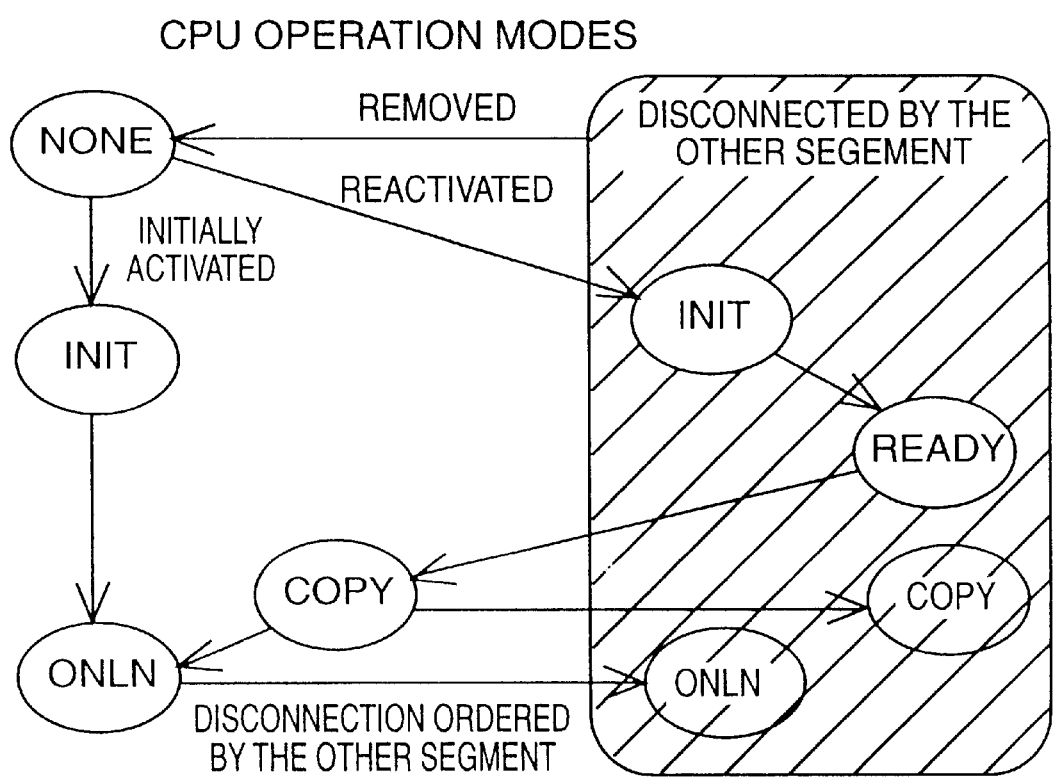
FIG. 17 is a state transition diagram showing operation modes of the CPU block.

An OR element 121 ORs the signal 64A with another CPU block disconnection request signal, and a status register 122 holds the state of the CPU in the current segment. There are six CPU states, as shown in FIG. 17 (NONE, INIT, READY, COPY, ONLN, DISCON). A disconnection determining circuit 120 determines which of the segments is to be disconnected in accordance with three signals: the disconnection request signal 123 output by the OR element 121 to disconnect the other segment, the disconnection request signal 125 issued by the PXI of the other segment to disconnect the current segment, and a status signal from the status register 122 of the CPU on the current segment side.

Because errors can occur concurrently at two locations, and because an error can take place in the current segment while the other segment is being disconnected, a disconnection order signal issued simply upon receipt of a disconnection request signal may inadvertently lead to a disastrous state in which the two segments are both disconnected. For this reason, the disconnection determining circuit 120 negotiates to see if the disconnection may proceed before asserting a signal LXDISCONA 124 ordering the disconnection of the segment B from the segment A.

FIG. 16 is a list of decision logic of the disconnection determining circuit 120. As indicated, the disconnection order signal LXDISCONA 124 ordering the disconnection of the segment B from the segment A is asserted only on the condition that the current segment is in an on-line state (ONLN), that there is no request for disconnecting the current segment, and that the disconnection request for disconnecting the other segment is being issued by the CPU of the current segment.

FIG. 17 is a state transition diagram showing operation modes of the CPU block, and FIG. 18 is a list of descriptions defining each of the states shown in FIG. 17. There are six CPU states: NONE, INIT, READY, COPY, ONLN and DISCON. The NONE state is a completely inactive state in which the CPU has not yet been installed or its clock is being stopped. The INIT state is a state in which the CPU of the current segment is being initialized in the out-of-sync state with its counterpart of the other segment. The READY state is a state in which the CPU is ready and waiting to execute a memory copy operation. The COPY state is a state in which the CPU is matching the memory contents by memory copy operation from the other segment. The memory copy operation will be described later. The ONLN state is a state in which the CPU in question is incorporated in the system and operating normally. The DISCON state is a state in which the CPU of the other segment is issuing a disconnection order signal.

The NONE state is entered when the CPU is initially activated. The CPU enters the ONLN state after being initialized. If the CPU develops an error in its dual synchronous operating state, is disconnected because of that error, and has been reactivated after recovery from the error, the CPU is initialized and made ready to wait for a memory copy operation from the CPU of the other normal segment. The CPU then enters the COPY state in which to undergo the memory copy operation from the CPU of the other segment. With the copy completed, the CPU enters the ONLN state and returns to the dual synchronous operating state.

Typical operations of the fault-tolerant computer system embodying the invention will be described below.

(1) Operation without I/O bus access

Where program execution takes place with only the processors and memories in operation and with no I/O bus access carried out, the two CPUs 1A and 1B perform the same program in the same sequence in a synchronous manner.

(2) Operation involving I/O bus access

Figures 19A, 19B:
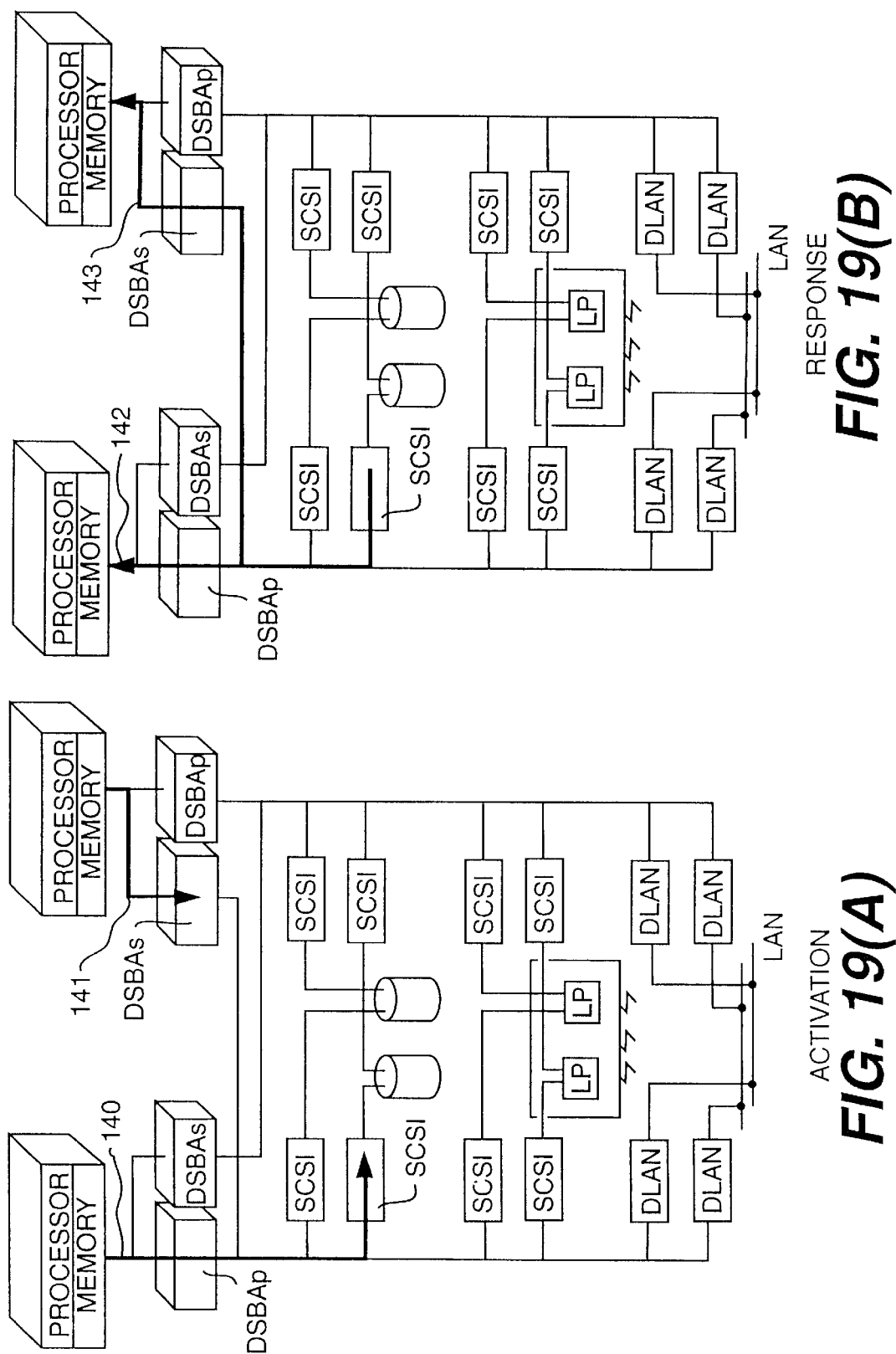
FIGS. 19(A) and 19(B) are schematic views outlining an I/O access operation performed when both segments are normal.

FIGS. 19(A) and 19(B) are schematic views outlining an I/O access operation performed when the two segments are normal. As shown in FIG. 19(A), at the start of the I/O access operation, the two CPUs issue access commands to the same I/O adapters simultaneously. The primary and secondary DSBAs receive the access commands but only the primary DSBA transmits the access command it received to the I/O bus or I/O adapter (140, 141). A response from the I/O bus/adapter side is received by the primary and secondary DSBAs, as depicted in FIG. 19(B). Thus, the same response is returned simultaneously to the two CPUs 1A and 1B (142, 143).

Although FIGS. 19(A) and 19(B) only show the example in which the CPUs are the source of access, a DMA (direct memory access) setup where the I/O bus or an I/O device becomes the source of access may be implemented by simply reversing the activation-and-response order in FIGS. 19(A) and 19(B). More specifically, the two CPUs operating synchronously and one I/O bus or I/O adapter are interconnected through the primary and secondary DSBAs. One of the access commands from the CPUs is selected by the DSBA, and the access command from the I/O bus or I/O adapter is distributed to the two CPUs. In this manner, the CPUs continue to operate in their dual synchronous state involving I/O access operations.

When a CPU fault occurs, it is circumvented by taking a number of necessary steps such as (1) detection of the error, (2) localization of the faulty block, (3) disconnection of the faulty block, and (4) continuation of processing. Practically, in case of a CPU fault, the embodiment carries out the above steps automatically on a hardware basis.

(1) Detection of the error

The CPU block has various hardware-based error detecting means such as parity check circuits, as shown in FIG. 6. If any error is detected within the CPU block, the subsequent steps to deal with it are the same regardless of the nature of the error. For illustrative purposes, it is assumed here that a parity error occurred in the memory of one of the two segments.

(2) Localization of the faulty block

The PXI is notified that an error occurred. In return, the PXI localizes the block in which the error took place.

(3) Disconnection of the faulty block

When notified of the occurrence of the error, the PXI issues the disconnection order signal 65 (FIG. 15) to the faulty CPU block within a period of time as short as 300 ns. Given the disconnection order signal 65, the DSBA closes the output gate accordingly to disconnect the CPU block from the I/O bus (FIG. 10).

(4) Continuation of processing

FIGS. 20(A) and 20(B) are schematic views outlining an I/O access operation performed when the CPU in one of the two segments has failed. At the start of an I/O access operation, only the access command of the DSBA in the normal segment is transmitted to the I/O bus or I/O adapter (144) irrespective of whether the DSBA in question is primary or secondary. A response from the I/O bus/adapter side is received by the DSBA (primary or secondary) in the normal segment, as shown in FIG. 20(B), and returned to the normal CPU alone (145). Although FIGS. 20(A) and 20(B) only show the example in which the CPU is the source of access, a DMA (direct memory access) setup where the I/O bus or an I/O device becomes the source of access may be implemented by simply reversing the activation-and-response order in FIGS. 20(A) and 20(B). That is, a fault of the CPU in the other segment remains transparent to the normal CPU of the current segment in terms of the continuation of processing.

When a LANC fault occurs, it is circumvented by taking a number of necessary steps such as (1) detection of the error, (2) localization of the faulty component, (3) disconnection of the faulty component, and (4) resumption of processing. In practice, the embodiment in case of an LANC fault carries out the above steps in a coordinated manner involving both hardware and software.

(1) Detection of the error

As discussed with reference to FIG. 10, the DSBA monitors access attempts on the DS bus and, if any access attempt has failed to terminate normally, notifies the CPU of an access fault by outputting an interrupt transaction data pattern onto the system bus. If the access that failed to terminate normally is for a read operation, the DSBA sends fixed-pattern data to the CPU as the return data after placing the interrupt transaction data pattern onto the system bus. Described herein is a case in which the access that failed to terminate normally is for a read operation.

(2) Localization of the faulty component

The program operating on the processors in the CPU that was notified of the access fault through the interrupt transaction recognizes the DSBA-detected fault in accordance with the content of that interrupt transaction. A fault log gathered by the DSBA allows the program to localize the faulty component. For example, if the fault turns out to be a parity error on the DS bus, the program localizes the fault on the DS bus. If a PIO read time-out is detected and if no other error is detected upon access to the DS bus, the access address of the object on which the time-out was detected allows the program to determine that the faulty component is on the I/O adapter side of the access target.

(3) Disconnection of the faulty component

The program operating on the processors of the CPU that has localized the faulty component disconnects it by issuing a disconnection order command, ordering the severing of the logical connection between the I/O adapters and the I/O devices through a PIO write operation to the register space of the DSBA. This has already been discussed in connection with FIG. 10. If the I/O bus is normal and if the severity of the fault is such as to permit the I/O device to receive the disconnection order command regarding the register space of its own, then the program can disconnect the faulty component by issuing the disconnection order command to the I/O device in question.

(4) Continuation of processing

The program operating on the processors of the CPU logically connects the normal I/O adapter paired with its defective counterpart to the I/O devices. The program then reactivates the incomplete I/O processing. This allows the processing involving the I/O devices to continue. FIGS. 21(A) and 21(B) are schematic views showing how the above-described LANC switchover allows the processing to continue in an FDDI LAN setup.

Figure 22:
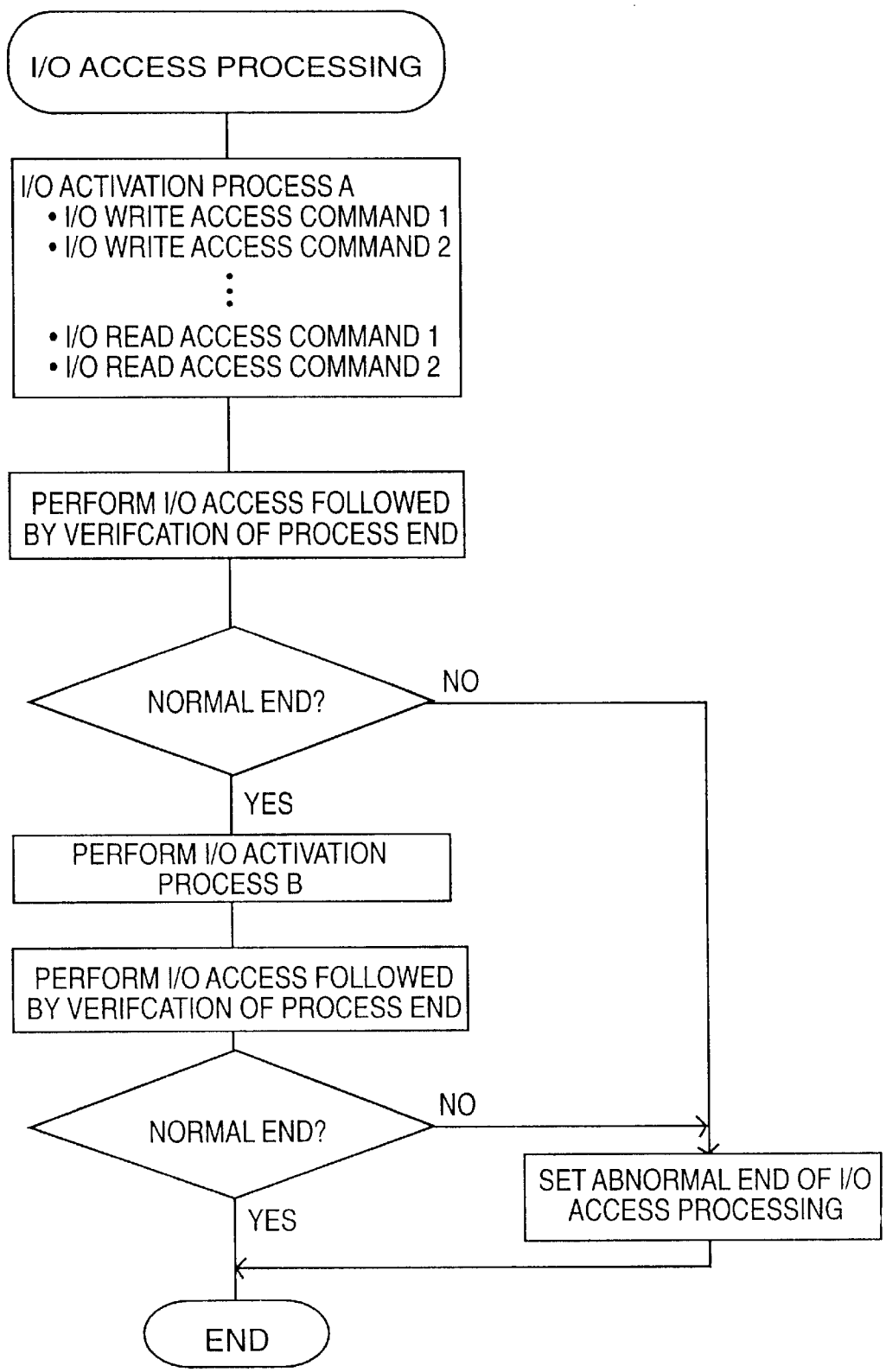
FIG. 22 is a flowchart of a typical program for I/O adapter control.

FIG. 22 is a flowchart of steps of a typical program for I/O adapter control. The program operating on the processors in the CPU may be required to verify the result of processing by checking to see if an I/O access command is normally terminated, as shown in FIG. 22. In such a case, the program issues an I/O read access command and checks to see if the read data from the command execution match fixed-pattern data. A match between the data upon I/O access tells the program that a fault has occurred. The I/O access command is carried out only at the end of a series of I/O processing steps so that any increase in the number of processing steps in the program is minimized.

Figure 23:
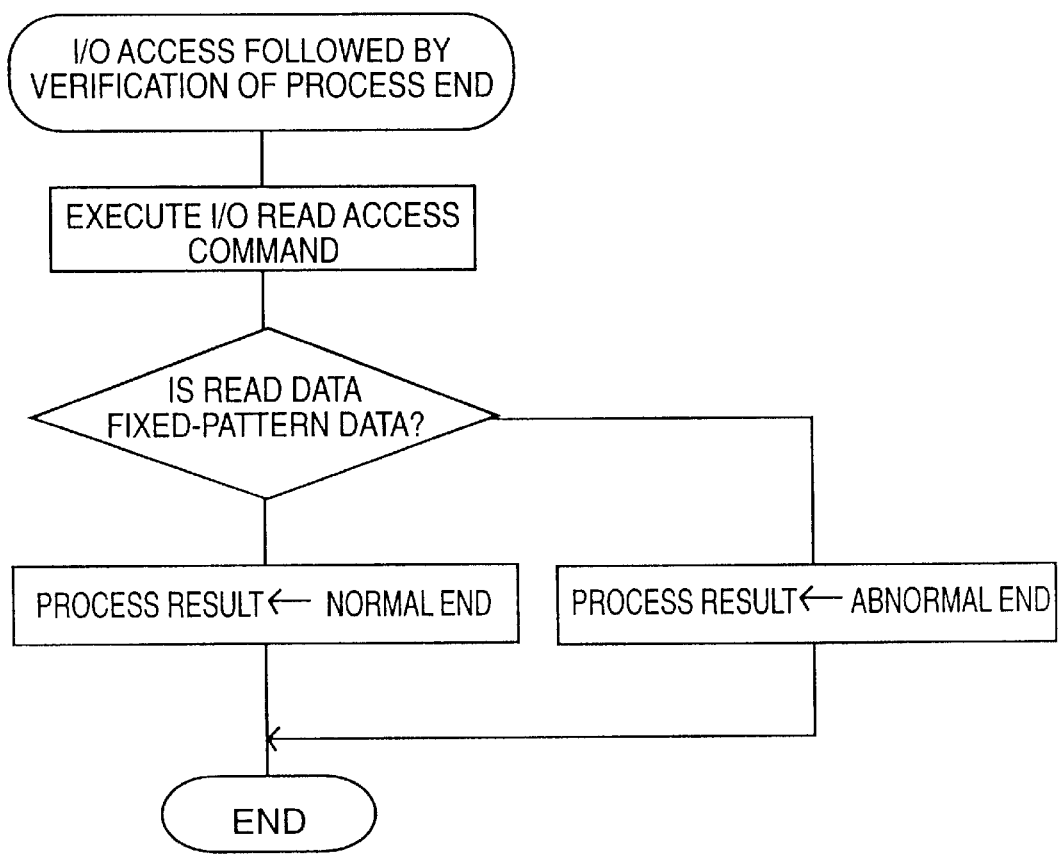
FIG. 23 is a flowchart of a typical program for I/O read access.

FIG. 23 is a flowchart of steps of a typical program for I/O read access. The program may be required to access a register containing a pointer value pointing to a memory address in the I/O devices. In such a case, the program issues an I/O read access command and checks to see if the read data from the command execution match fixed-pattern data. A match between the data upon I/O read access causes the program to recognize an I/O device fault. The program then abnormally terminates the processing in question. If the program operating on the processors in the CPU is allowed to continue its processing on the wrong assumption that the read data are correct, an incorrect memory address will be accessed. In that case, the probable result will be a sustained erroneous operation based on the wrong memory contents, destruction of the memory contents, or an attempt to access a nonexisting memory. Because the irregularities occur in the CPUs of both segments, they will lead to system downtime. A fault that is as serious as a system downtime is averted when the program verifies data integrity by checking to see if the read data match the fixed-pattern data; the program continues its processing only if the data are found to be correct.

Although various embodiments of the invention have been described, modifications to the invention will become apparent to the person of ordinary skill. All such modifications that basically rely upon the teachings through which the invention has advanced the state of the art are properly considered within the spirit and scope of the invention.

We claim:

1. A fault-tolerant computer system, comprising:

a central processing unit, including a memory for storing programs and data, and a processor for processing said programs and said data stored in said memory;

an input/output adapter for inputting and outputting results of processing by said central processing unit under instruction of said central processing unit; and a connecting module which connects said central processing unit to said input/output adapter, including monitoring means for monitoring access of said central processing unit to said input/output adapter, reporting means for reporting an access fault to said central processing unit when an access of said central processing unit to said input/output adapter fails to terminate normally, and returning means for returning fixed-pattern data to said central processing unit if the access that fails to terminate normally is for a read operation.

2. A fault-tolerant computer system, comprising:

a central processing unit, including a memory for storing programs and data, and a processor for processing said programs and said data stored in said memory;

a first input/output adapter for inputting and outputting results of processing by said central processing unit as instructed by said central processing unit;

a second input/output adapter identical to said first input/output adapter;

an input/output module connected physically to both said first and second input/output adapters; and a connecting module which connects said central processing unit to said first and second input/output adapters, including monitoring means for monitoring the access of said central processing unit to said first and second input/output adapters, reporting means for reporting an access fault to said central processing unit when an access fails to terminate normally, returning means for returning fixed-pattern data to said central processing unit if the access that fails to terminate normally is for a read operation, and disconnecting means for disconnecting a logical connection between one of said first and second input/output adapters and said input/output module as instructed by said central processing unit.

3. A fault-tolerant computer system, comprising:

a first central processing unit, including a memory for storing programs and data, and a processor for processing said programs and said data stored in said memory;

a second central processing unit identical to said first central processing unit;

clock generating means for supplying said first and second central processing units with clock and reset signals;

a first input/output adapter for inputting and outputting results of processing by said first and second central processing units as instructed by said first and second central processing units;

a first connecting module for a duplex system, which connects said first and second central processing units to said first input/output adapter;

a second input/output adapter which inputs and outputs results of processing by said first and second central processing units as instructed by said first and said second central processing units, said second input/output adapter being identical to said first input/output adapter; and a second connecting module for a duplex system, which connects said first and second central processing units to said second input/output adapter;

wherein said first and second central processing units include first and second interprocessor communicating means for communicating with each other; and wherein said first and second connecting modules each include monitoring means for monitoring access of one of said first and said second central processing units to said first and said second input/output adapters, reporting means for reporting an access fault to said first and second central processing units when an access fails to terminate normally, and returning means for returning fixed-pattern data to said first and second central processing units if the access that failed to terminate normally is for a read operation.

4. A fault-tolerant computer system, comprising:

a first central processing unit including a memory for storing programs and data, and a processor for processing said programs and said data stored in said memory;

a second central processing unit identical to said first central processing unit;

clock generating means for supplying said first and second central processing units with clock and reset signals;

a first input/output adapter for inputting and outputting results of processing by said first and second central processing units as instructed by said first and second central processing units;

a first connecting module for a duplex system, which connects said first and second central processing units to said first input/output adapter;

a second input/output adapter which inputs and outputs results of processing by said first and second central processing units as instructed by said first and second central processing units, and which is identical to said first input/output adapter;

a second connecting module for a duplex system, which connects said first and second central processing units to said second input/output adapter; and an input/output module connected physically to both said first and second input/output adapters;

wherein said first and second connecting modules each include disconnecting means for disconnecting a logical connection between one of said first and second input/output adapters and said input/output module as instructed by said first and second central processing units.

5. A fault-tolerant computer system, comprising:

a first central processing unit, including a memory for storing programs and data, and a processor for processing said programs and said data stored in said memory;

a second central processing unit identical in constitution to said first central processing unit;

clock generating means for supplying said first and second central processing units with clock and reset signals;

a first input/output adapter for inputting and outputting results of processing by said first and second central processing units as instructed by said first and second central processing units;

a first connecting module for a duplex system, which connects said first and second central processing units to said first input/output adapter;

a second input/output adapter which inputs and outputs results of processing by said first and second central processing units as instructed by said first and second central processing units, and which is identical to said first input/output adapter;

a second connecting module for a duplex system, which connects said first and second central processing units to said second input/output adapter; and an input/output module connected physically to both said first and said second input/output adapters;

wherein said first and second central processing units include first and second interprocessor communicating means for communicating with each other; and wherein said first and said second connecting modules each include monitoring means for monitoring access of one of said first and second central processing units to one of said first and second input/output adapters, reporting means for reporting an access fault to said first and second central processing units when an access fails to terminate normally, returning means for returning fixed-pattern data to said first and second central processing units if the access that failed to terminate normally is for a read operation, and disconnecting means for disconnecting a logical connection between one of said first and second input/output adapters and said input/output module as instructed by said first and second central processing units.

6. A fault-tolerant method of disconnecting a faulty component from a computer system having a central processing unit and an input/output adapter accessed by said central processing unit for inputting/outputting results of processing by said central processing unit under instruction of said central processing unit, comprising the steps of:

monitoring access of a central processing unit to an input/output adapter;

reporting an access fault to said central processing unit when an access of said central processing unit to said input/output adapter fails to terminate normally; and returning fixed-pattern data to said central processing unit if the access that fails to terminate normally is for a read operation.

7. A fault-tolerant method of disconnecting a faulty component from a computer system having a central processing unit and an input/output module accessed by said central processing unit for inputting/outputting results of processing by said central processing unit, via first and second input/output adapters, under instruction of said central processing unit, comprising the steps of:

monitoring access of said central processing unit to said first and second input/output adapters;

reporting an access fault to said central processing unit when an access fails to terminate normally;

returning fixed-pattern data to said central processing unit if the access that fails to terminate normally is for a read operation; and disconnecting a logical connection between one of said first and second input/output adapters and said input/output module as instructed by said central processing unit.

8. A fault-tolerant method of disconnecting a faulty component from a computer system having first and second central processing units, and first and second input/output adapters accessed by said first and second central processing units for inputting/outputting results of processing by said first and second central processing units under instruction of said first and second central processing units, comprising the steps of:

monitoring access of one of said first and said second central processing units to said first and said second input/output adapters;

reporting an access fault to said first and second central processing units when an access fails to terminate normally; and returning fixed-pattern data to said first and second central processing units if the access that failed to terminate normally is for a read operation.

9. A fault-tolerant method of disconnecting a faulty component from a computer system having first and second central processing units, and an input/output module accessed by both said first and second central processing units for inputting/outputting results of processing by said first and second central processing units, via first and second input/output adapters, under instruction of said first and second central processing units, comprising the steps of:

monitoring access of one of said first and second central processing units to one of said first and second input/output adapters;

reporting an access fault to said first and second central processing units when an access fails to terminate normally;

returning fixed-pattern data to said first and second central processing units if the access that failed to terminate normally is for a read operation; and disconnecting a logical connection between one of said first and second input/output adapters and said input/output module as instructed by said first and second central processing units.

* * * * *